(12) United States Patent
Farb et al.

(10) Patent No.: US 9,883,238 B2
(45) Date of Patent: *Jan. 30, 2018

(54) ASSET CONFLICT RESOLUTION FOR CONTENT ON DEMAND ASSET INSERTION

(71) Applicant: Canoe Ventures LLC, Englewood, CO (US)

(72) Inventors: Jonathan E. Farb, New York, NY (US); Thomas M. Moretto, Denver, CO (US); Bruce C. Dilger, Medford, NJ (US); Timothy R. Whitton, Parker, CO (US); Christopher M. Rippe, Lafayette, CO (US)

(73) Assignee: Canoe Ventures LLC, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,382

(22) Filed: Jul. 5, 2016

(65) Prior Publication Data

US 2016/0330519 A1 Nov. 10, 2016

Related U.S. Application Data

(63) Continuation of application No. 13/628,381, filed on Sep. 27, 2012, now Pat. No. 9,386,349.

(51) Int. Cl.
| | |
|---|---|
| *H04N 21/44* | (2011.01) |
| *H04N 21/458* | (2011.01) |
| *H04N 21/472* | (2011.01) |
| *H04N 21/81* | (2011.01) |

(52) U.S. Cl.
CPC ...... *H04N 21/458* (2013.01); *H04N 21/44016* (2013.01); *H04N 21/4583* (2013.01); *H04N 21/47202* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2003/0149975 A1* | 8/2003 | Eldering | H04N 7/17318 725/34 |
| 2010/0228591 A1* | 9/2010 | Therani | G06Q 30/00 705/14.54 |

\* cited by examiner

*Primary Examiner* — Cai Chen
(74) *Attorney, Agent, or Firm* — Duft Bornsen & Fettig LLP; Gregory T. Fettig

(57) ABSTRACT

Systems and methods presented herein provide for conflict resolution of assets selected for insertion into COD content. In one embodiment, the system includes an interface operable to process a request for asset insertion into the COD content selection. The system also includes an asset conflict resolution module operable to identify asset timeslots within the COD content selection from the request, to evaluate the assets to determine conflicts among the assets, to remove conflicting assets, and to select at least a portion of the remaining assets for insertion in the asset timeslots of the COD content selection. For example, the asset conflict resolution module may determine that conflicts exist between certain assets based on various identifiers associated with the assets and/or content such that the conflicts between the assets may be resolved with the removal of one or more of the assets from potential asset insertion selection.

21 Claims, 15 Drawing Sheets

ASSET CONFLICT RESOLUTION FOR CONTENT ON DEMAND ASSET INSERTION

CROSS REFERENCE TO RELATED APPLICATIONS

This patent application is a continuation of commonly owned and co-pending patent application Ser. No. 13/628,381 (filed Sep. 27, 2012), the contents of which are incorporated by reference.

FIELD OF THE INVENTION

The invention relates to the field of Content On Demand (COD) systems and more specifically to the conflict resolution between assets, such as advertisements and promotionals, for insertion into COD content.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services substantially increased, television evolved into a much more complex system of communications. For example, cable television providers and satellite television providers now serve as an intermediary between the content providers and the intended public audience. And, the number of content providers has increased accordingly. In this regard, many members of the general public have signed on as customers of the cable/satellite television providers so as to receive a broader availability of content.

Because the market for content consumption has grown, the number of television providers has also grown. And, because each of these providers has its own method of content delivery, the manner in which the content and assets are delivered to the customers has become increasingly complex. Generally, the content providers deliver the content to the television providers with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the television providers with directions to insert the assets within the timeslots purchased by the company.

The television providers may also have certain timeslots available for inserting certain local assets. For example, a television provider may have "headends" configured in various communities to distribute content to their customers located therein. Each headend receives content from the content providers with various designated timeslots for inserting assets into the content. Some of those timeslots may be designated for local ads where companies within the service area of the headend wish to advertise. These companies purchase those timeslots from the television provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the television providers' customers are able to digitally record entire episodes of content and view that content at their leisure, as opposed to a time established by the content providers. However, these customers could also use the digital recorders to fast-forward or skip through the assets without viewing them, much to the dismay of the asset owners/marketers.

In response, television providers started providing content on a "Content On Demand" (COD) basis, occasionally referred to as nonlinear video distribution. In COD, the content provider delivers the content to the television provider which in turn maintains the content for subsequent and individual distribution to their customers. Thus, a customer may select a desired content through a set-top box (STB) or other device and watch that content at the customer's leisure. This COD content is also typically configured with timeslots where assets may be inserted. However, marketing strategists have not been able to determine the effectiveness of asset insertion in COD content.

SUMMARY

Systems and methods presented herein provide for conflict resolution of assets selected for insertion into COD content. In one embodiment, the system includes an interface operable to process a request for asset insertion into the COD content selection. The system also includes an asset conflict resolution module operable to identify asset timeslots within the COD content selection from the request, to evaluate the assets to determine conflicts among the assets, to remove conflicting assets, and to select at least a portion of the remaining assets for insertion in the asset timeslots of the COD content selection. The asset conflict resolution module may use a multidimensional asset separation criteria based on asset brand, asset product category, or the like, to ensure that assets are properly separated within a COD content selected by a customer. Alternatively or additionally, the asset conflict resolution module, for at least one of the assets, may be further operable to validate a break position for the asset; validate an asset separation of the asset; validate an asset definition of the asset; validate an asset duration of the asset; determine whether the asset is available on an Asset Decision Manager; determine whether the asset is available in a target window; determine whether the asset is available in a license window; or perform a combination thereof.

The asset conflict resolution module may also be operable to evaluate the selected assets to determine values of the assets to a provider of the COD content selection. For example, the asset conflict resolution module may direct placement of the selected assets into the asset timeslots within the COD content selection based on the determined values of the assets.

The asset conflict resolution module may also be operable to identify at least two of the selected assets for selection that have a combined presentation duration corresponding to one of the asset timeslots, and to direct insertion of at least two selected assets into the one asset timeslot. For example, the selected assets may have a combined duration equivalent to one of the asset timeslots. In this regard, the asset conflict resolution module may direct insertion of the two selected assets into the single asset timeslot.

The asset conflict resolution module may also be operable to identify an owner of a first asset to determine a conflict with a second asset and to remove the first asset from insertion selection based on the owner of the first asset. In one embodiment, the asset conflict resolution module is operable to determine a separation period for the asset timeslots of the COD content selection based on the selected assets, and to remove one or more of the selected assets from insertion selection based on the separation period. For example, certain companies may request that assets relevant to their products/services be separated in time with other of their assets and/or assets of others with similar product/services. The asset conflict resolution module may therefore generate a separation period between such assets. The asset conflict resolution module may also be operable to communicate with a provider of the COD content selection to provide a report of the selected assets inserted into the asset timeslots of the COD content selection.

In one embodiment, a provider of the selected COD content is a headend and the system is configured within that headend to direct insertion of the ranked assets into the selected COD content. For example, the interface may be further operable to access an asset database at the headend and insert the one or more assets into the selected COD content. Alternatively, the system may be configured outside of the headend and be operable to communicate with, and rank assets for, multiple headends. Thus, although discussed with respect to a single selection of COD content by a Customer Premise Equipment ("CPE"), the invention is not intended to be so limited. Rather, the COD asset insertion decision system described herein may be operable to provide asset insertion to a multitude of COD content selections from a multitude of CPEs. The system may even be operable to provide asset ranking for COD content that is selected over the Internet or other non-MSO (Multiple System Operator) dependent systems.

The various embodiments disclosed herein may be implemented in a variety of ways as a matter of design choice. For example, the embodiments may take the form of physical machines, computer hardware, software, firmware, or combinations thereof. In another embodiment, a computer readable medium is operable to store software instructions for resolving conflicts related to the directed insertion of assets into content. These software instructions are configured so as to direct a processor or some other processing system to operate in the manner described above.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass internet servers delivering COD content when selected by a user from a device, such as a computer, a tablet, or a mobile phone. A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein is any type of media, such as audio and/or video, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) found in modern cable television as well as pay-per-view (PPV) delivered by both modern cable television and satellite television.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
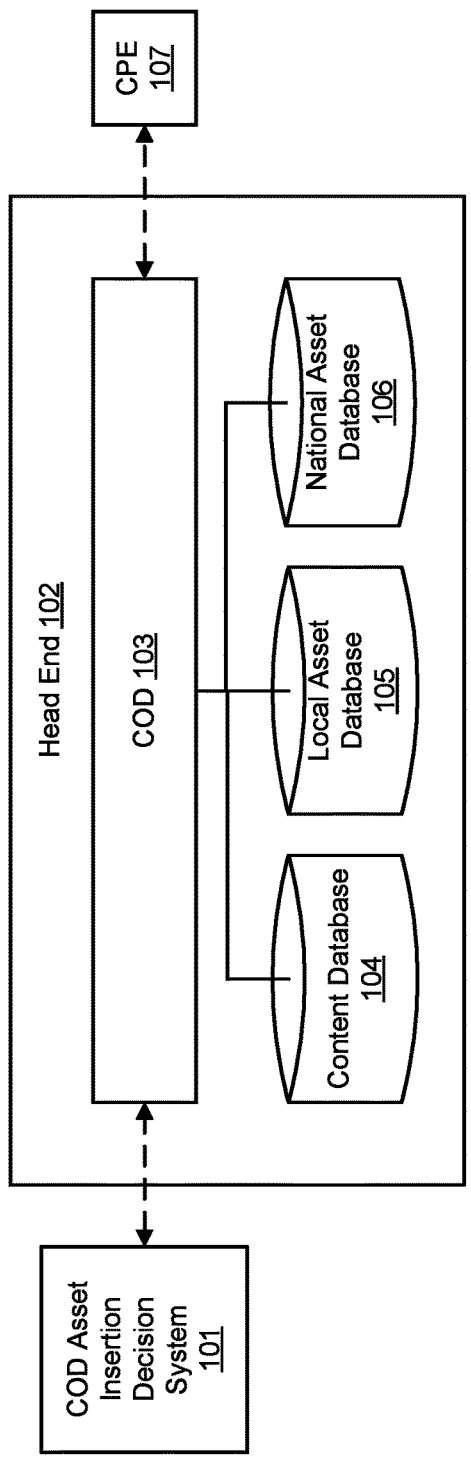
FIG. 1 is a block diagram of an exemplary COD asset insertion decision system operable with a COD system of a headend.

FIG. 1 is a block diagram of an exemplary COD asset insertion decision system 101 operable with a COD system 103 (also known as a "COD back office system") of a headend 102. The headend 102 is generally any system operable to receive content for processing and distribution to a CPE 107 (e.g., over a cable television infrastructure or from satellite). For example, the headend 102 may receive content from content providers over television signals for distribution to the customers of a cable television provider via the customer premise equipment (CPE) 107, such as a set-top box (STB), a gaming console, a smart phone, an electronic tablet, a computer, or the like.

To provide the COD content, the headend 102 includes a COD system 103 that is operable to provide content to the CPE 107 when desired by the customer. For example, the headend 102 may receive the content from the content providers and maintain that content within a content database 104. The headend 102 may also maintain local assets in a local asset database 105 and national assets in a national asset database 106. When a particular content is selected by the user of the CPE 107, the COD 103 accesses the content database 104 to retrieve the selected content and deliver that content to the CPE 107. In this regard, the COD 103 is any system or device that is operable to deliver video content to the CPE 107 when directed by the CPE 107. The COD asset insertion decision system 101 is any system or device that is operable to direct insertion of assets into the content provided to the CPE 107 by the COD 103. The databases 104, 105, and 106 are any systems or devices operable to store and maintain data, audio, and/or video for subsequent distribution to the CPE 107. For example, the databases 104, 105, and 106 may be operable within a computer system that stores the video and audio (e.g., MPEG) content and assets such that they may be accessed by the COD 103 and delivered to the CPE 107 when desired by the user of such.

Figure 2:
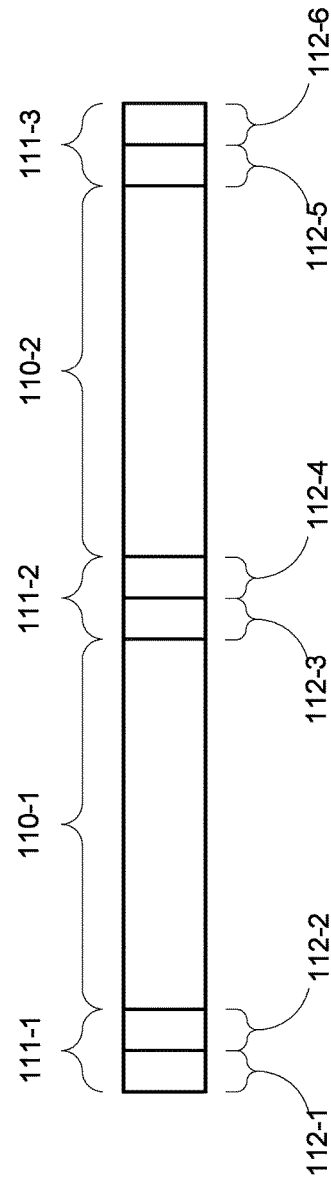
FIG. 2 is an exemplary timing diagram of content interlaced with asset timeslots.

To illustrate the insertion of assets into content, FIG. 2 shows an exemplary timing diagram of content 110 interlaced with asset timeslots 111, also known as "break positions". When the COD 103 receives a message from the CPE 107 for the content 110, the COD 103 retrieves the content 110 from the content database 104. The content 110, in this embodiment, is divided into two segments 110-1 and 110-2 with timeslots 111 disposed at the front end of the content 110-1 (i.e., timeslot 111-1 at the pre roll position), in between the content segments 110-1 and 110-2 (i.e., timeslot 111-2 at the mid roll position), and at the end of the content segment 110-2 (i.e., timeslot 111-3 at the post roll position). Each timeslot 111 is divided into two asset placement timeslots 112, or "placement opportunities", each of which being capable for accepting an asset that is typically, but not always, 30 seconds in duration. Thus, a placement opportunity is generally a subset of time of a particular timeslot 111. The COD asset insertion decision system 101 directs the COD 103 to insert the assets according to a particular ranking that provides value for an MSO and/or a content provider (e.g., monetary value, enhanced relationships with asset providers, etc.). In this regard, the COD asset insertion decision system 101 may direct the COD 103 to select assets from the national asset database 106 and/or the local asset database 105 for insertion into the asset timeslots 112-1-112-6 based on the ranking provided by the COD asset insertion decision system 101.

The invention is not intended to be limited to the COD asset insertion decision system 101 merely providing direction to the COD 103 for selection of various assets in a local asset database 105 and the national asset database 106. In one particular embodiment, the COD asset insertion decision system 101 is communicatively coupled to a content provider so as to receive instructions regarding various campaigns from asset providers on a national level. Alternatively or additionally, the COD asset insertion decision system 101 is communicatively coupled to asset providers to receive and direct insertion of the assets therefrom into the content 110. In some embodiments, such as those illustrated below, the COD asset insertion decision system 101 may be configured with the headend 102 to direct insertion of assets into the asset timeslots 112-1-112-6.

Figure 3:
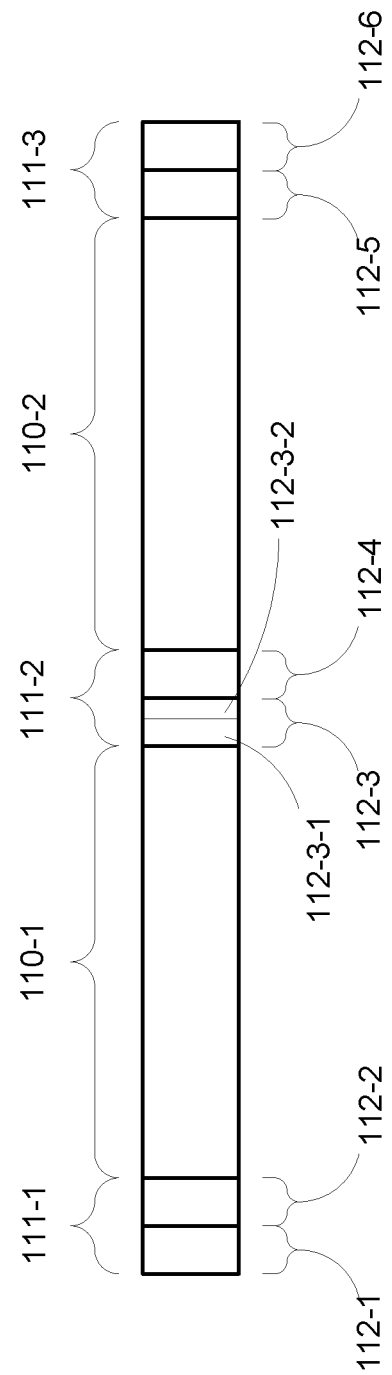
FIG. 3 is another exemplary timing diagram of content interlaced with asset timeslots.

Also, the invention is not intended be limited to any particular number of content segments 110 or any particular number of asset timeslots. In fact, an asset timeslot 112 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 112 may be configured to accept insertions of two 15 second assets. An example of such is illustrated in FIG. 3. In FIG. 3, the content 110 is illustrated with the mid roll timeslot 111-2 having two 30 second asset timeslots 112-3 and 112-4. The asset timeslot 112-3 is further divided into two 15 second asset timeslots 112-3-1 and 112-3-2, allowing for the insertion of two 15 second assets into the asset timeslot 112-3. Still, the invention is not intended to be limited to any particular asset duration, asset timeslot 112 duration, or timeslot 111 duration as such may be configured to meet certain business and/or technical needs.

It should be noted that the decisions regarding the direction of asset insertions occur quite rapidly. For example, the COD asset insertion decision system 101 may be operable to make asset insertion decisions for a plurality of headends 102. And, each headend 102 may be operable to provide COD content to a plurality of CPEs 107 at any given time, possibly thousands or more. Thus, when a COD content selection is made by a particular CPE 107, the COD asset insertion decision system 101 responds in substantially real time to ensure that the COD 103 has ample time to retrieve and insert the assets while processing the content selected by the CPE 107.

Figure 4:
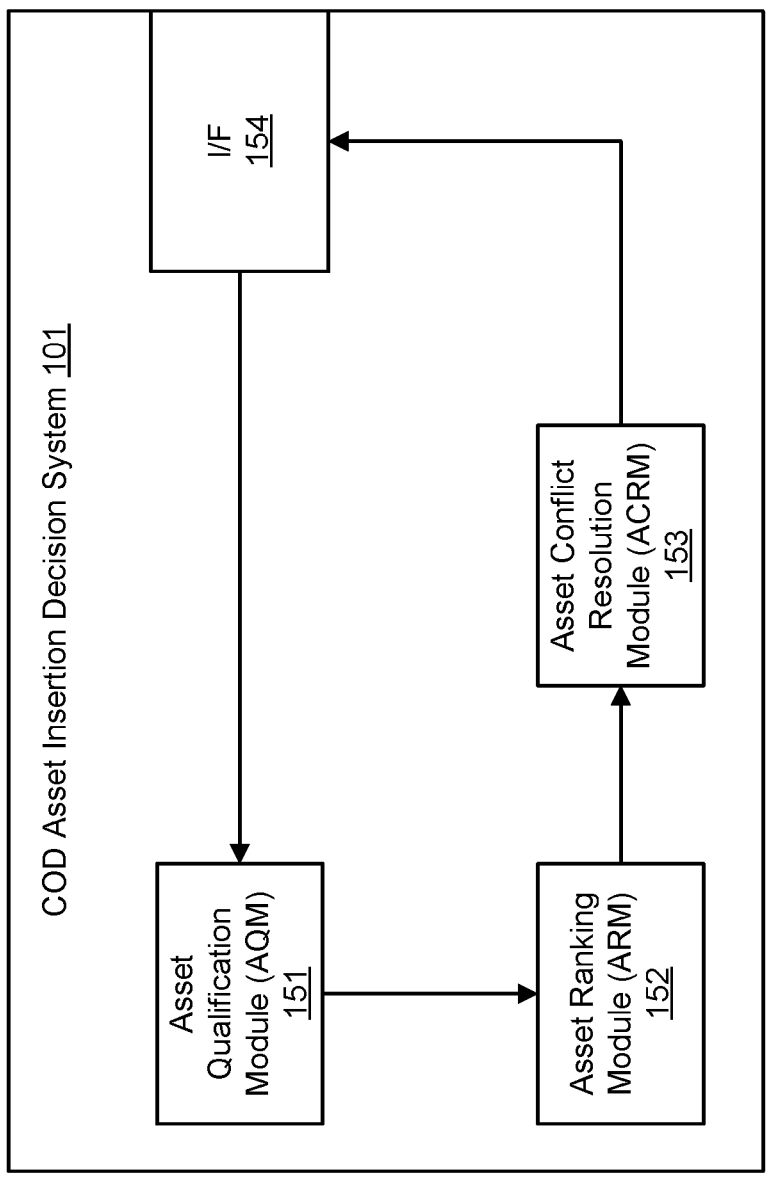
FIG. 4 is block diagram of an exemplary COD asset insertion decision system.

FIG. 4 is a block diagram of an exemplary COD asset insertion decision system 101. In this embodiment, the COD asset insertion decision system 101 includes an interface 154, an asset qualification module (AQM) 151, an asset ranking module (ARM) 152, and an asset conflict resolution module (ACRM) 153. The interface 154 is any device or system operable to receive information pertaining to a content selection by a CPE 107 such that the COD asset insertion decision system 101 may direct asset insertion into the selected content. In this regard, the interface 154 may also be operable to transfer information to the COD 103 to direct the COD 103 to insert certain assets from the national asset database 106 and/or the local asset database 105.

The AQM 151 is any device or system operable to communicate with the interface 154 to initially qualify assets for insertion within the content. The AQM 151 may exclude certain assets from insertion into the content selected by the CPE 107. The ARM 152 is any device or system operable to rank the remaining assets (i.e., those not already excluded by the AQM 151) for insertion to the content 110. The ACRM 153 is any device or system operable to remove any ranked assets from insertion into the content 110 based on conflicts between assets. For example, the ACRM 153 may determine that assets from certain advertisers conflict with one another (e.g., Coke and Pepsi). Accordingly, the ACRM 153 may be operable to prevent assets from these advertisers from being inserted within a same timeslot 111 or even within a same content 110. The exemplary operations of the AQM 151, the ARM 152, and the ACRM 153 are explained in greater detail below in FIGS. 9-14.

Figure 5:
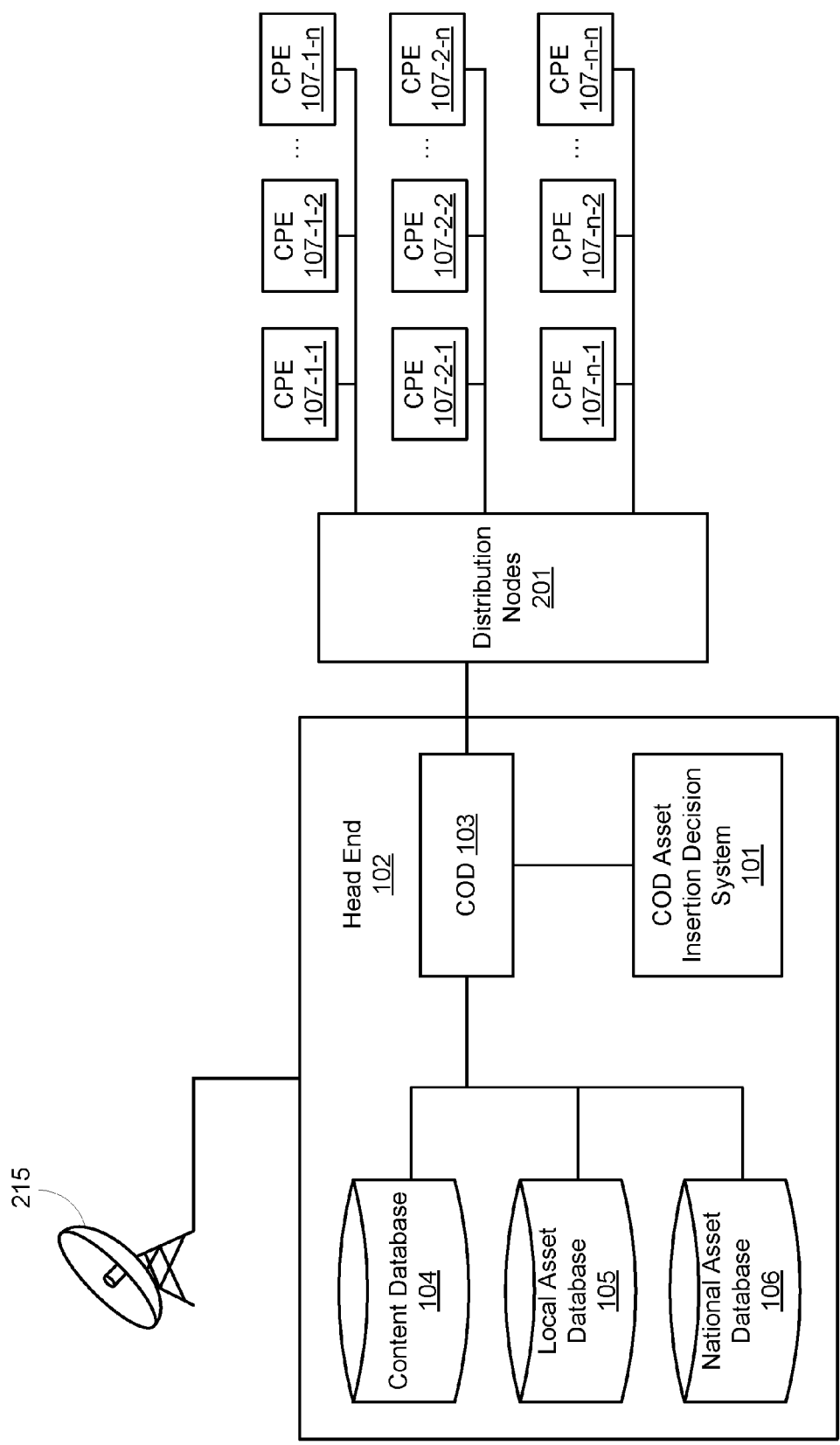
FIG. 5 is a block diagram of an exemplary COD asset insertion decision system operable within a cable television headend.

FIG. 5 is a block diagram of an exemplary COD asset insertion decision system 101 configured within the headend 102 to retrieve assets from the local asset database 105 and/or the national asset database 106 for insertion into COD content. For example, the headend 102 may receive content from a communication link such as the satellite dish 215. The headend 102 may store that content within the content database 104 for distribution to various CPEs 107 when so directed. The headend 102 may be communicatively coupled to one or more distribution nodes 201 to distribute content to the CPEs 107.

Content within the content database 104 that is available to the CPEs 107 is presented to the CPEs through a programming menu from the headend 102. For example, the headend 102 provides a signal to the CPEs 107 via the distribution nodes 201 containing information relating to programming, available COD content, date and time, CPE firmware instructions and updates, etc. The CPE 107 processes the signal and displays much of this information to the user via some type of display module, such as a television or a computer monitor (not shown). A user of the CPE 107 typically navigates through the information via a remote control of the CPE 107. In this regard, the user may retrieve a menu of available COD content within a content database 104 and select a desired content. The user's content selection is transferred to the COD 103 of the headend 102 via the distribution nodes 201. The COD 103 then retrieves the selected content from the content database 104 for playback to the selecting CPE 107, generally after verification that the selecting CPE 107 is indeed a valid customer of the headend 102. The COD asset insertion decision system 101 is communicatively coupled to the COD 103 to process the content selection of the CPE 107 and determine the appropriate assets to insert in the various timeslots of the selected content.

A distribution node 201 is any system or device operable to interface between the headend 102 and multiple CPEs 107 for the purposes of communication. For example, the headend 102, in general, does not directly link to the CPEs 107. For a traditional cable television MSO, this generally involves a system of feeder cables and drop cables that define a number of system subsections or branches. Signals from the headend 102 may be processed by the distribution nodes 201 to insert localized content, filter locally available channels, or otherwise control the content delivered to users in the locale of a particular node. The resulting content within a node's locale is typically distributed by optical and/or coaxial links to the individual CPE 107. Each CPE 107 processes the signal from the headend 102 to display the content on the display device, such as a television, computer screen, smart phone, tablet, etc.

As shown herein, the distribution nodes 201 are aggregated into a single element for the purposes of illustration. Each distribution node 201 is coupled to a plurality of CPEs 107 to distribute the signals from the headend 102 and to process communications from the CPEs 107 to the headend 102. For example, a first distribution node 201 may be communicatively coupled to the CPEs 107-1-1-107-1-$n$, whereas a second distribution node 201 may be communicatively coupled to the CPEs 107-2-1-107-2-$n$, and so on (where "n" is merely intended to represent an integer greater than 1 and not necessarily equal to any other "n" reference number shown and described herein).

Figure 6:
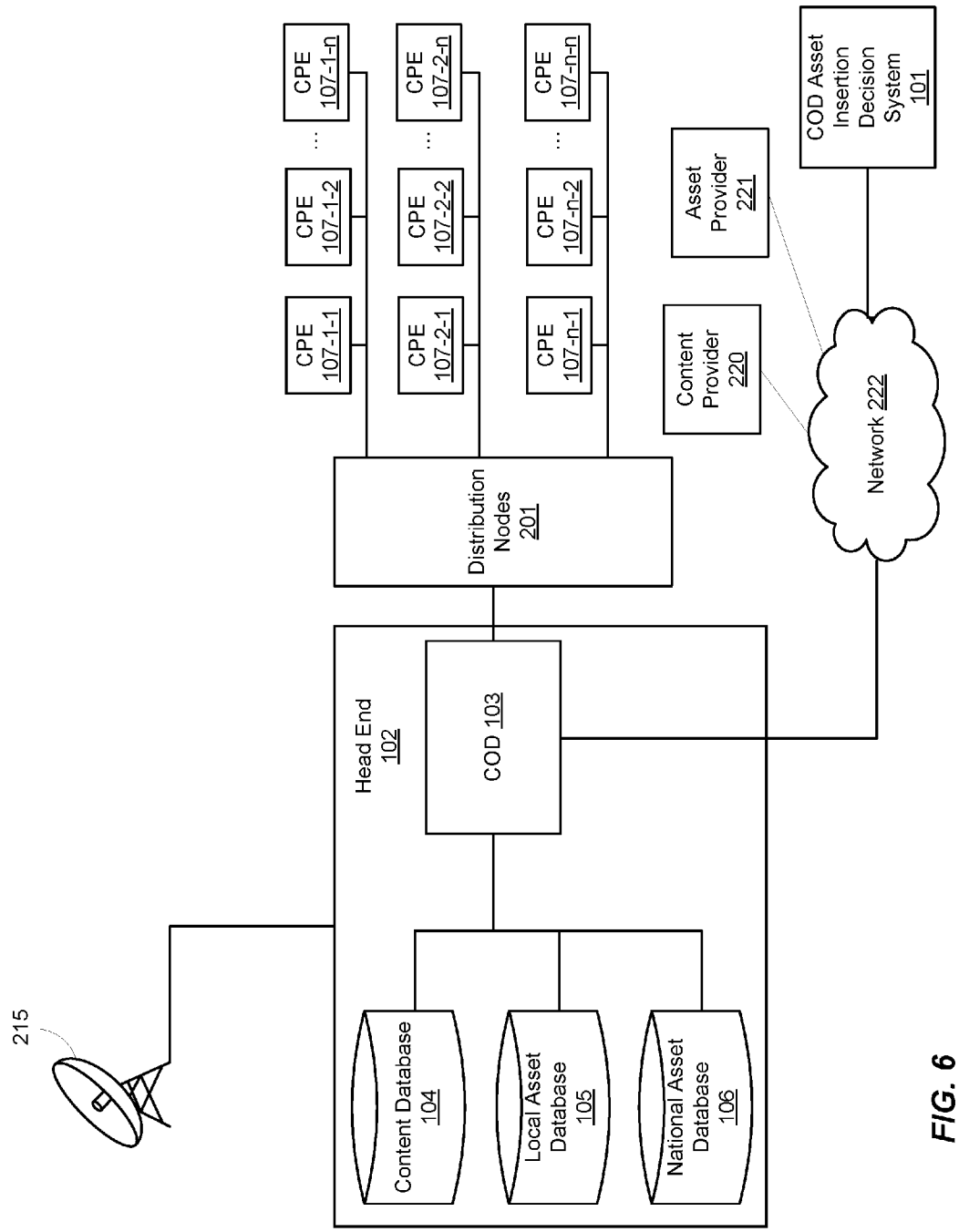
FIG. 6 is a block diagram of an exemplary COD asset insertion decision system operable with a cable television headend through a network.

FIG. 6 is a block diagram of an exemplary COD asset insertion decision system 101 operable with a headend 102 through a network 222. In this embodiment, the COD asset insertion decision system 101 is separate from the headend 102 and communicates therewith via a network 222. For example, the COD asset insertion decision system 101 may be a remotely configured system that interacts with the headend 102. In this regard, the COD asset insertion decision system 101 may be operable to interface directly with content providers 220 and/or asset providers 221 to receive information through the network 222 regarding certain asset campaigns of the asset providers 221. For example, the content providers 220 and the asset providers 221 may negotiate to place certain assets within content from the content providers 220. The asset campaigns may be developed using certain assets from the national asset database 106 and/or the local asset database 105. Information pertaining to these negotiated asset campaigns may be conveyed to the COD asset insertion decision system 101 via the network 222. The COD asset insertion decision system 101 may then use this information and direct the COD 103 to retrieve and insert the assets of those campaigns into the COD content selected by the CPEs 107.

The network 222 may be any type of communication link capable of providing communication between the COD asset insertion decision system 101 and the headend 102. For example, the network 222 may be the Internet, an Intranet, or some other type of data network. Alternatively, the network 222 may be an analog network operable to communicate content, such as analog television networks and analog radio networks. The network 222 may also be implemented as a virtual private network via the Internet. In any case, the COD asset insertion decision system 101 may communicate through the network 222 using standard cable television protocols such as the Society of Cable Telecommunications Engineers (SCTE) standards.

Figure 7:
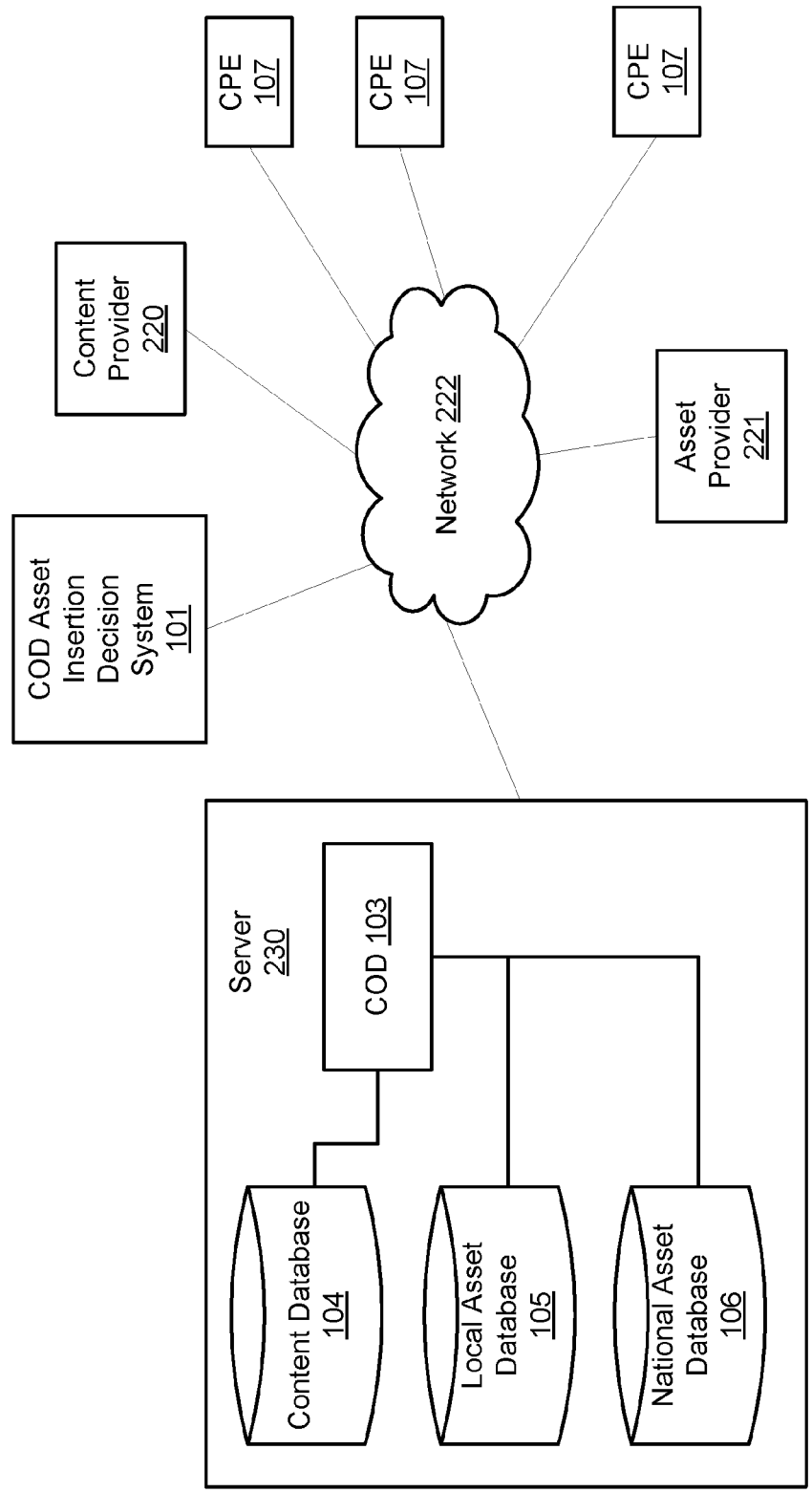
FIG. 7 is a block diagram of an exemplary COD asset insertion decision system operable within a server to deliver network-based content.

FIG. 7 is a block diagram of an exemplary COD asset insertion decision system 101 operable with a server 230 to deliver content through the network 222. In this embodiment, the server 230 includes the COD 103 to deliver content from the content database 104 to the CPEs 107 via the network 222. Again, the COD asset insertion decision system 101 is operable to direct insertion of assets from the national asset database 106 and/or the local asset database 105 into the content for presentation to the users of the CPEs 107. In this regard, the server 230 may be configured to receive content from the content provider(s) 220 and maintain that content within a content database 104. The server 230 may also receive assets from the asset provider(s) 221 and store that content within the local asset database 105 and the national asset database 106 as appropriate. The invention, however, is not intended to be limited to any particular manner in which the server 230 is intended to receive the content and/or the assets from their various providers.

The CPE 107 may be a computer or a mobile computing device capable of displaying video from the network 222 (e.g., via streaming video over the Internet). For example, a CPE 107 may select a desired content from an Internet website hosted with the server 230 through the network 222. Once selected, the COD 103 may retrieve the content from the content database 104 for Internet delivery to the selecting CPE 107. The COD asset insertion decision system 101, being communicatively coupled to the COD 103, processes information pertaining to the content selection and selects assets for insertion into that content from the national asset database 106 and/or the local asset database 105. The COD asset insertion decision system 101 may do so based in part on the campaigns of the asset providers 221 and in a manner that provides value to the content providers 220.

Although shown with the COD asset insertion decision system 101 external to the server 230 and coupled through the network 222, other embodiments may have the COD asset insertion decision system 101 configured within the server 230. Moreover, the COD asset insertion decision system 101 may also be a server that communicates to the various devices and systems described herein over the Internet. Accordingly, configuration of the COD asset insertion decision system 101 is not intended to be limited to any particular illustrated embodiment.

Figure 8:
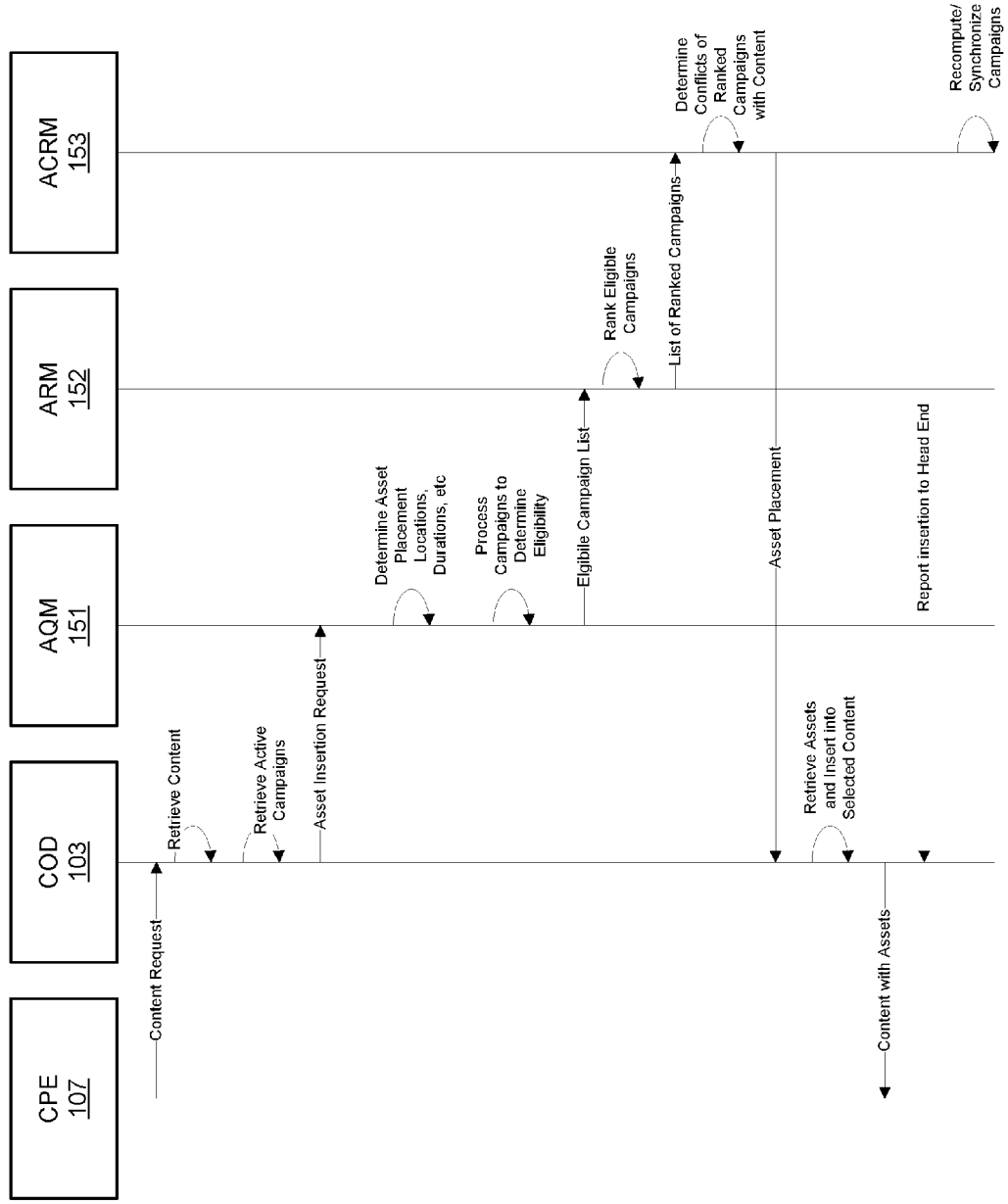
FIG. 8 is an exemplary message diagram of a COD asset insertion decision system.

FIG. 8 is an exemplary message diagram of a COD asset insertion decision system 101. Initiation of the COD asset insertion begins when a CPE 107 selects a particular content provided by the headend 102. The CPE 107 transfers a content request to the COD 103 which in turn retrieves the content from the content database 104. The COD 103 may also retrieve active campaigns from the national asset database 106 and/or the local asset database 105. For example, each asset provider may generate an advertising campaign with one or more campaign items. Each of these campaign items may be associated with one or more assets of the asset provider designating the desired time, date, content, audience/demographic, etc. for which the assets are to be inserted into selected COD content. The COD 103 may retrieve the active campaigns of the asset providers and generate an asset insertion request for the AQM 151 of the COD asset insertion decision system 101.

Upon receiving the request, the AQM 151 may determine certain parameters relating to the placement of the assets. For example, the AQM 151 may determine durations of the assets and various placement opportunities for the assets (i.e., appropriate timeslots within the selected content). The AQM 151 may also process the active campaigns to determine their eligibility within the content to generate a list for the ARM 152 such that the ARM 152 may rank and select eligible campaigns from that list. In doing so, the AQM 151 may exclude certain campaigns from the list based on various criteria, such as whether the asset provider and/or the asset itself are valid and whether the insertion opportunities themselves are valid. An embodiment of the AQM 151 is exemplarily shown in greater detail below in FIGS. 9-12.

Once the ARM 152 receives the eligible campaign list, the ARM 152 ranks the various campaign items that include assets of the campaigns for insertion into the content selected by the CPE 107. The ARM 152 may rank the campaign items based on, among other things, their value to the content provider and/or the television provider, the strategy of the campaign, and the priority of the campaign. An embodiment of the ARM 152 is exemplarily shown and described in greater detail below in FIG. 13. The ranked list of eligible campaign items is then generated and transferred to the ACRM 153 which determines whether any conflicts exist among the ranked campaign items. The ACRM 153 excludes certain assets of campaigns from insertion when they conflict with others in the content selected by the CPE 107. For example, when one campaign conflicts with another campaign in the list for a particular selected content, the asset of the higher ranked campaign may be inserted into the content effectively excluding the lower-ranked campaign from that content. An embodiment of the ACRM 153 is exemplarily shown and described below in FIGS. 14 and 15.

Once the ACRM 153 removes conflicts from the ranked list of possible campaigns, the ACRM 153 transfers the final placement of the assets within the content to the COD 103, which in turn inserts the assets into the timeslots of the selected content. The COD 103 may then retrieve the assets from the local asset database 105 and/or the national asset database 106 for insertion of the assets into the selected content. With the assets inserted into the selected content, the COD 103 transfers the content and assets to the CPE 107 for presentation to the user thereof.

After the content is delivered to the CPE 107 with the inserted assets, the COD asset insertion decision system 101 reports the insertion (e.g., to the headend 102, the content providers 120, and/or the asset providers 121) and recomputes and/or synchronizes campaigns for another content selection by a CPE 107. For example, once certain goals have been met for a particular campaign, the achieved goals may lower the ranking of that campaign or even exclude it from future insertions in selected COD content. Accordingly, the COD asset insertion decision system 101 may retain information pertaining to the insertion of assets for use in determining subsequent asset insertions.

In one embodiment, the COD asset insertion decision system 101 may receive information from the headend 102 indicative of actual views of the inserted assets. For example, the headend 102 may be operable to access a CPE 107 to determine when a COD content selection is stopped such that a portion of the asset insertions are not seen by the viewer of the content selection. This information may be transferred back to the COD asset insertion decision system 101 such that the campaign data of those non-viewed assets can be compensated or corrected. In other words, when assets are inserted into COD content selections and they are not viewed because of some action on the part of the viewer, such as stopping or fast forwarding the COD content selection, the campaigns of those assets should not be influenced. Accordingly, the COD asset insertion decision system 101 may take this information into consideration and recompute how close the campaign is to meeting its targeted goal for views.

Additionally, the COD asset insertion decision system 101 may periodically synchronize a database storing information of the insertions for use as a failsafe and/or to reduce (e.g., minimize) the number of accesses to the database. For example, a database may be used to store campaign data of the assets to ensure that the asset insertion decision system 101 does not over use the assets. The asset insertion decision system 101 may access this database each time a request for asset insertion is received. To reduce the number of processor intensive accesses to the database, the asset insertion decision system 101 may record a list of assets that are inserted and then operate off that list for directing subsequent insertions. After some period of time, the COD asset insertion decision system 101 may access the database and repopulate it with the recorded insertions such that campaign data is refreshed. Also, in the event of a failure to communicate with the database, the headend 102, the content providers 120, and/or the asset providers 121 regarding how and when to perform asset assertions, the COD asset insertion decision system 101 may operate from the list and repopulate the database once it becomes available.

It should be noted that the invention is not intended to be limited to any particular messaging format. In some embodiments, the COD asset insertion decision system 101 interacts with the COD 103 using the standards established by the Society of Cable Television Engineers (SCTE). In other embodiments, the COD asset insertion decision system 101 interacts with the COD 103 using an Entertainment Identifier Registry (EIDR). EIDR provides a manner in which content and assets may be "tagged" with unique identifiers that are operable to distinguish the content and assets from one another. For example, content and assets generally have associated metadata to distinguish themselves from one another based on various aspects, such as age, maturity level, actors, products, and the like. EIDR identifiers are generally capable of incorporating this metadata to provide a compact means for uniquely tagging the content and assets for rapid identification due in part to its central registration. That is, each particular content and asset is identified with a unique EIDR identifier that is maintained by central registration system so that individual headends and the like may quickly identify and use the registered content and assets.

To provide more context to the operations of the COD asset insertion decision system 101, the following example is provided.

The CPE 107 selects a particular episode of the television show "30 Rock" at 8 pm on a Thursday night from a menu of COD content that is presented by the COD 103. The COD 103 retrieves that episode of 30 Rock from the content database 104. The COD 103 then retrieves certain assets from the national asset database 106 for insertion into the timeslots of that show. As with many other 30 minute situational comedies, this episode of 30 Rock includes two content sections 110-1 and 110-2 and the three timeslots 111-1, 111-2, and 111-3, as illustrated in FIG. 2. Using this example, the COD 103 transfers an asset insertion request to the AQM 151 to insert assets into these three timeslots. The AQM 151 then determines that there are a total of six 30 second asset placement opportunities within three timeslots 111-1-3 of the selected content 110. The AQM 151 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
   a) Asset 1 for 100 views anytime;
   b) Asset 2 for any viewing opportunities Monday through Friday between the hours of 5 pm and 10 pm; and
   c) Assets 3 and 4 for any viewing opportunities Friday and Saturday between the hours of 5 pm and 10 pm.

2. A Pepsi-Cola campaign with a total of five assets and four campaign items directing placement opportunities of those assets as follows:
   a) Asset 1 for 20 views anytime;
   b) Asset 2 for 100 views anytime;
   c) Asset 3 for 1000 views anytime;
   d) Asset 4 for any viewing opportunities Monday through Friday between the hours of 5 pm and 10 pm; and
   e) Asset 5 for any viewing opportunities Friday and Saturday between the hours of 5 pm and 10 pm.

3. A Capital One credit card campaign with a total of four assets and three campaign items directing placement opportunities of those assets as follows:
   a) Asset 1 for 100 views anytime;
   b) Asset 2 for 1000 views anytime; and
   c) Assets 3 and 4 for any viewing opportunities Monday through Friday between the hours of 5 pm and 10 pm.

4. A Chrysler Motors campaign with a total of three assets and two campaign items directing placement opportunities of those assets as follows:
   a) Asset 1 for 100 views; and
   b) Assets 2 and 3 for any viewing opportunities Monday through Friday between the hours of 5 pm and 10 pm.

5. A Nickelodeon campaign with one asset and one campaign item directing placement opportunities of that asset as follows:
   a) Asset 1 for 100 views.

Since the television show 30 Rock has a mature theme and since the Nickelodeon campaign is directed towards a younger audience, that campaign item is automatically excluded from the eligible campaign list by the AQM 151. Other remaining campaign items are excluded based on time and date (i.e., campaign items 1c and 2e).

Thus the remaining campaigns of 1a-1b, 2a-2d, 3a-c, 4a-4b are transferred to the ARM 152 for ranking. Based on various factors explained in greater detail below, the ARM 152 ranks the campaigns as follows:
1. Campaign Item 2a
2. Campaign Item 1a
3. Campaign Item 3c
4. Campaign Item 2b
5. Campaign Item 4b
6. Campaign Item 4a
7. Campaign Item 1b
8. Campaign Item 1d
9. Campaign Item 2c
10. Campaign Item 1c
11. Campaign Item 2d
12. Campaign Item 3a
13. Campaign Item 3b The ARM 152 transfers this ranked list of campaign items to the ACRM 153 to determine conflicts within the ranked list of campaign items. Typically, the six available asset placement opportunities 112-1-6 within the content 110 would be filled by the first six campaign items based on a rank determined by the ARM 152. However, since some conflicts may exist between campaigns within a particular content and/or timeslot, certain campaigns may be excluded from the placement opportunities 112 such that the ranking is reordered. For example, certain criteria may dictate that a Pepsi Cola asset may not be placed within the same content as a Coca-Cola asset. In this regard, the campaign items 1a-1d are removed from the ranked list because the Pepsi-Cola asset has the higher initial ranking, leaving the following campaign items:
1. Campaign Item 2a
2. Campaign Item 3c
3. Campaign Item 2b
4. Campaign Item 4b
5. Campaign Item 4a
6. Campaign Item 2c
7. Campaign Item 2d
8. Campaign Item 3a
9. Campaign Item 3b With this computed, the ACRM 153 may remove the final three campaign items 7, 8, and 9 from the list as the six placement opportunities can be filled with assets. The ACRM 153 then transfers this information regarding asset placement to the COD 103. This general embodiment of the messaging may be implemented in any of the above COD asset insertion decision system embodiments for use in directing the insertion of assets within the content. Other more specific embodiments are shown below.

Figure 9:
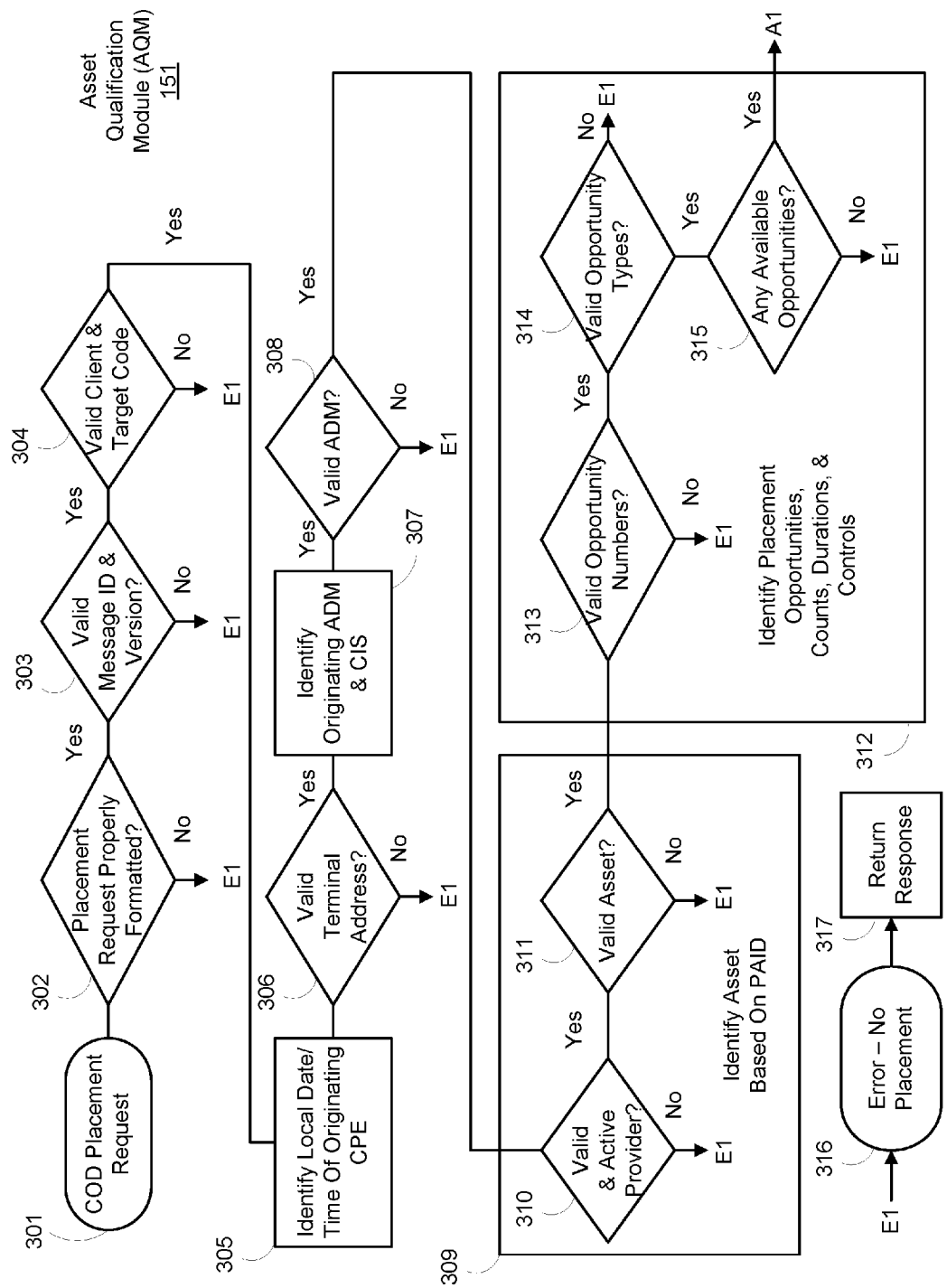
FIG. 9 is an exemplary flowchart of an Asset Qualification Module (AQM) within a COD asset insertion decision system.
Figure 10:
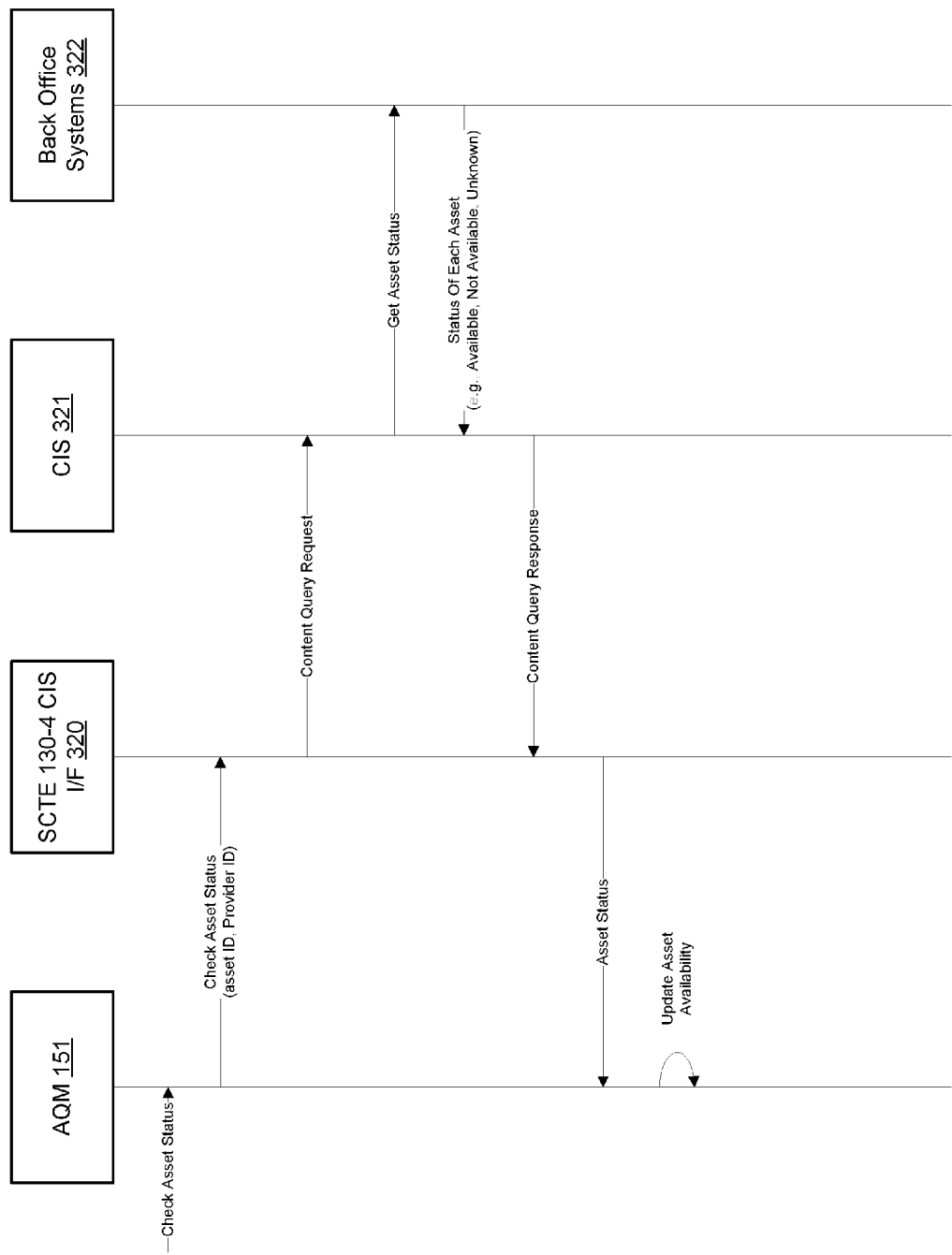
FIG. 10 is an exemplary message diagram of the AQM.
Figure 11:
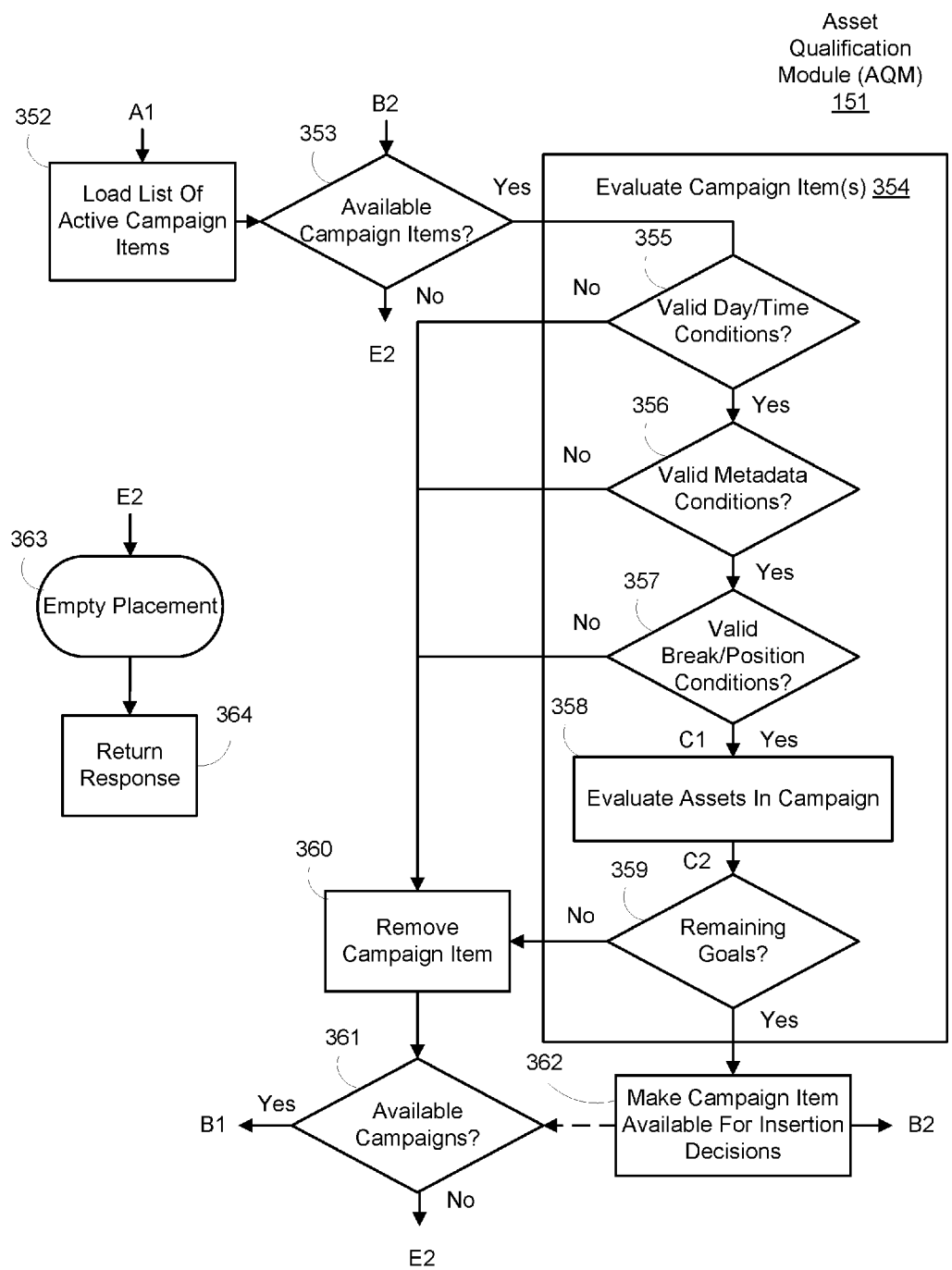
FIGS. 11-12 are also exemplary flowcharts of the AQM.
Figure 12:
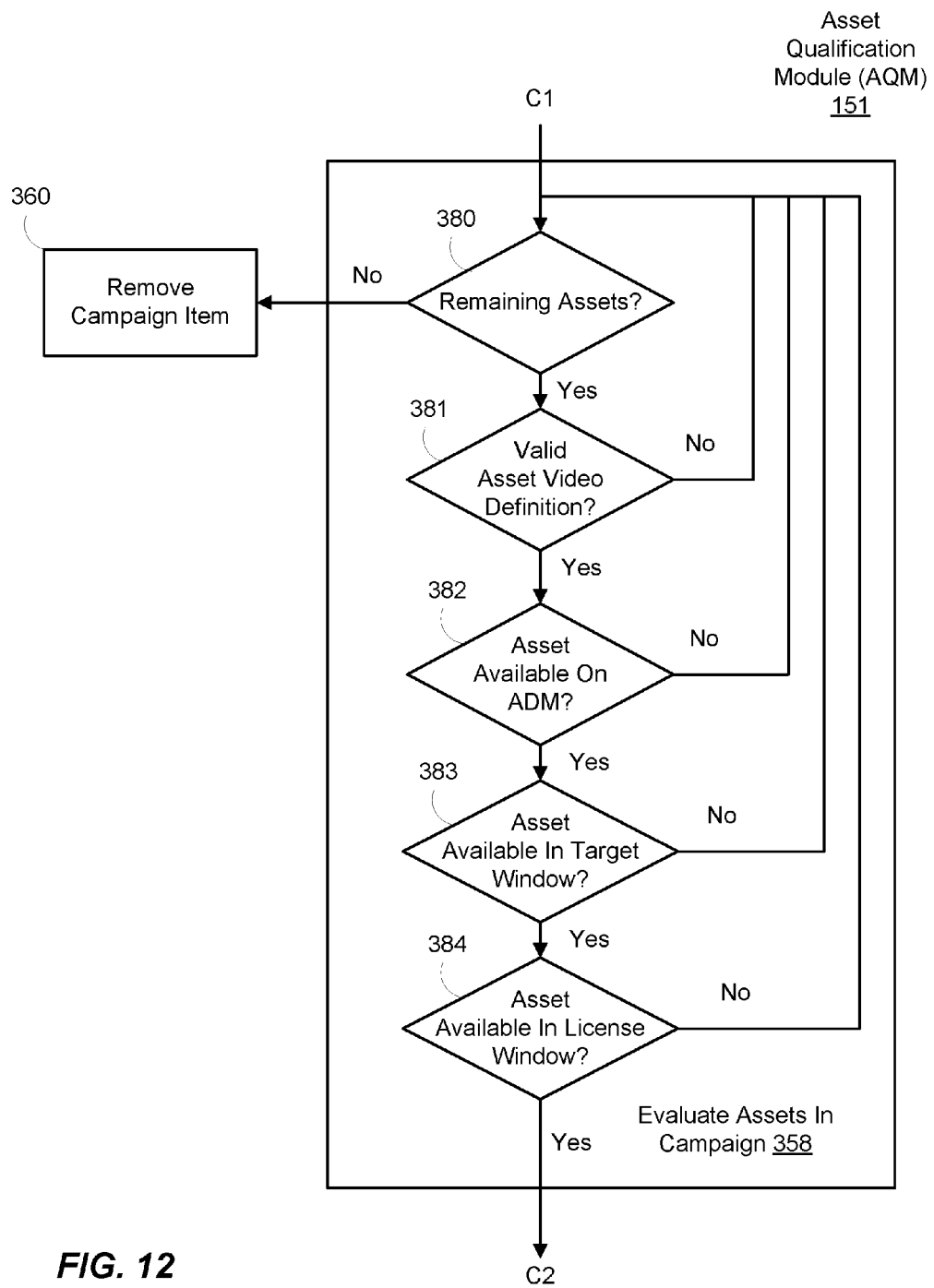

FIGS. 9, 11, and 12 are exemplary flowcharts of an AQM 151 within a COD asset insertion decision system 101. FIG. 9 represents the initial reception of a COD placement request and the validation process of the selected COD content, the CPE 107, and the content provider. FIG. 9 also illustrates the validation process of placement opportunities of assets within the selected COD content to determine whether any placement opportunities exist. FIG. 10 is an exemplary message diagram of the flowchart of FIG. 9. FIG. 11 represents the qualification process of campaigns to determine whether assets of those campaigns can be placed within the selected COD content. FIG. 12 represents the evaluation process of individual assets within the campaigns.

Returning to FIG. 9, the AQM 151 receives a COD placement request in the process element 301. The COD placement request originates from the COD 103 and directs the COD asset insertion decision system 101 to begin identifying assets for placement into a particular COD content selected by the CPE 107. The COD placement request includes information such as the date, time, and rating of the content selected as well as the address of the CPE 107 selecting the content (e.g., physical address, MAC address, etc.). The AQM 151 upon receiving the COD placement request makes a series of decisions which ultimately results in asset placements for the selected COD content. Failure in the initial decisions results in an error, E1, that precludes placement of an asset, in the process element 316. If the error occurs, the AQM 151 provides a response to the COD 103 generating the COD placement request, in the process element 317.

Otherwise, the AQM 151 determines whether the placement request is properly formatted, in the process element 302. For example, messaging formats among content providers are varied. As part of a means for simplifying the communication for asset placement, the COD asset insertion decision system 101 may standardize the format of COD placement requests from content providers. In one embodiment, the interface 154 of the COD asset insertion decision system 101 receives messages from the CODs of different content providers and formats them into the COD placement request such that content providers who are not affiliated with the COD asset insertion decision system 101 may be rejected according to improperly formatted COD placement request. In other words, the formatting of the COD placement request may act as a form of security to prevent unauthorized content providers from seeking access to the COD asset insertion decision system 101. Although the formatting by the COD asset insertion decision system 101 may be implemented as a matter of design choice, one manner of formatting includes the Web Services Description Language (WSDL). WSDL is an Extensible Markup Language, or XML, format for describing network services as a set of endpoints operating on messages containing either document-oriented or procedure-oriented information. The operations and messages are described abstractly and then bound to a particular network protocol and message format to define an endpoint. Related endpoints are combined into abstract endpoints, or services. The extensibility of WSDL generally allows for the description of endpoints and their messages regardless of what message formats or network protocols are used to communicate.

The AQM 151 then determines whether the message ID and version are valid, in the process element 303. For example, as another security feature, the COD asset insertion decision system 101 may assign message identifiers to each authorized content provider with version numbers to ensure that unauthorized content providers do not access the COD asset insertion decision system 101. The version numbers may be useful in assuring that authorized content providers accounts are up to date. That is, even though a content provider may be authorized to access the COD asset insertion decision system 101, they may not be able to request placement of assets in their COD content because they have been temporarily restricted (e.g., due to failures of payment, assets being deemed inappropriate, etc.).

Once the AQM 151 validates the message ID and version of the COD placement request, the AQM 151 validates the client and target code within the COD placement request. For example, information regarding the CPE 107 may indicate whether the CPE 107 is authorized to receive COD content. Based on this information, the AQM 151 may validate the CPE 107 and verify that the target of the selected COD content is indeed that CPE 107. After doing so, the AQM 151 may identify the local date and time of the CPE 107 (e.g., to identify when assets may run in the selected content). The AQM 151 then validates the terminal address of the CPE 107. To illustrate, a stolen CPE 107 may appear as an authorized CPE. However, since that stolen CPE 107 has changed locations, the terminal address of that CPE has also changed due to its connection to a new cable link. Accordingly, the AQM 151 verifies that the CPE 107 is indeed located where it is supposed to be located. Alternatively, this functionality may be configured within the headend 102.

Afterwards, the AQM 151 identifies the originating Asset Decision Manager (ADM) and Content Information Service (CIS) of the COD 103 and then determines whether the ADM is valid, in the process elements 307 and 308. For example, SCTE standard 104 (SCTE-104) defines an interface between automation systems and compression systems that encode a digital video stream (e.g., an MPEG stream of content) at the headend 102. Using SCTE-104, the automation system provides instructions and metadata from which a compression system creates SCTE standard 35 messages as private data packets in the digital video stream. SCTE standard 130 (SCTE-130) defines an architecture for communication and interoperation among various systems employed in cable television advertising. Based on this standard, the interface to campaign management is the Asset Decision Service (ADS) and the interface to an asset insertion system is the ADM. The standard also includes a CIS that defines services for subscriber information and placement opportunities within content to support inventory exchange.

Various vendor systems at the headend 102 perform the actual contract management, cue message detections, and asset insertions. SCTE-130 defines the interface that isolates the details of each vendor's system and acts as a front-end through which other systems provide and consume cooperating services. The ADS determines how assets are combined with content. The ADM defines messages in support of asset insertion activities. The primary consumer of these messages is the ADS. The message interfaces exposed by the ADM allow for preconfigured asset decisions and real-time asset fulfillment models. An ADM may incorporate some rudimentary asset selection rules, such as asset rotation, but more complex asset decisions are the responsibility of the ADS. The CIS manages metadata describing the assets, advertising and non-advertising, that are available to the other logical services defined by SCTE-130. The CIS provides query and notification interfaces to these logical services. The query service is available on an ad-hoc basis and may be called by any other logical service at any time without any prior registration. Queries specify values or patterns to be sought in the query message metadata and the specified matching information is returned in a response message.

Once the ADM is identified, the AQM 151 validates the ADM to ensure that it is authorized to access the COD asset insertion decision system 101, in the process element 308. After validation, the AQM 151 identifies the asset based on its programmer and asset identifier (the "PAID"), in the process element 309, to determine whether the asset provider is valid and active (process element 310) and whether the asset from that provider is valid (process element 311). For example, the AQM 151 may independently verify the existence of each asset at each operator location. To verify the distribution status of assets, the AQM 151 may employ SCTE-130 part 4 (SCTE-130-4) pertaining to CIS logical interfaces. Thus, the AQM 151 may query each operator CIS endpoint using the unique ID of each asset and the provider's unique programmer ID, or PAID. An example of this message flow is illustrated in FIG. 10.

In this embodiment, the AQM 151 is initiated to check the status of an asset such as when the interface 154 of the COD asset insertion decision system 101 receives the COD placement request 301. The AQM 151 generates and transfers a request to check the asset status (i.e., the PAID) to a SCTE-130-4 interface 320 of the COD 103. The COD 103 in turn generates and transfers a content query request to a CIS 321 of the COD 103. The CIS 321 then sends a request to retrieve the asset status from back office systems 322 of the COD 103 (e.g., the data bases 105 and 106). For example, the back office systems 322 may determine whether the asset is available, unavailable, or its availability is unknown. The status is then returned to the CIS 321 and transferred to the interface 320 in a content query response. The interface 320 informs the AQM 151 of this asset status such that the AQM 151 can determine whether such an asset placement would be valid. If it is not valid, the AQM 151 returns the error response E1 as in other instances and then updates the asset availability. If the asset is valid, its status is also updated such that it may be used for placement in content (i.e., an asset placement timeslot).

With the asset identified and validated, the AQM 151 may then identify placement opportunities within the content selected by the CPE 107, in the process element 312. For example, the content may have certain designated placement opportunities for the assets. The number, or counts, of these timeslots and their durations are used by the AQM 151 to assist in the selection and placement of assets. The AQM 151 may also identify and use any control information associated with timeslots that could restrict certain assets. In identifying these placement opportunities, the AQM 151 validates whether the content selected by the CPE 107 has placement opportunities for the assets and what that number is, in the process element 313. If so, the AQM 151 validates whether the placement opportunities are of the appropriate type, in the process element 314. As mentioned, placement opportunities may include control information or metadata that restricts certain assets from being placed within a selected content. For example, age control information of selected content may be used to restrict certain assets from being placed within that content based on age (e.g., COD children's shows having control information that restricts assets with more mature content and vice versa). If the opportunity times within the content are valid, the AQM 151 determines whether any placement opportunities are still available within the content selected by the CPE 107, in the process element 315.

After the validation process is complete, the AQM 151 qualifies campaigns to determine whether assets of those campaigns can be placed within the selected COD content, as illustrated in FIG. 11. In doing so, the AQM 151 retrieves and loads a list of active campaign items, in the process element 352. For example, the AQM 151 may contact the COD 103 via the SCTE-130-4 messaging above to access the active campaigns within the local asset database 105 and/or the national asset database 106 to determine asset campaigns that are active at the headend 102. Once the list of active campaigns has been retrieved, the AQM 151 determines whether there are any campaign items that are available. If not, the AQM 151 generates an empty placement, in the process element 363, and a response to the COD 103 originating the COD placement request 301, in the process element 364. For example, if no campaign items are available for asset placement but placement opportunities actually exist within the content selected by the CPE 107, the AQM 151 leaves the placement opportunities open for the headend 102 to insert assets within the selected COD content as desired. In some instances, the AQM 151 may even recommend placement of a noncommercial asset, such as an asset advertising the regular date and time for viewing content from a network (e.g., advertising relating to television programming for a particular TV show).

If campaign items are available for asset placement within the placement opportunities of the content selected by the CPE 107, the AQM 151 evaluates the campaign items in the process element 354. In doing so, the AQM 151 validates the day/time conditions of a campaign item in the process element 355 to ensure that a particular asset in the campaign item is appropriate for the date and time when the COD content is selected by the CPE 107. For example, a commercial for a mature audience may not be appropriate for viewing until later evening hours when children are not present. Thus, if the COD content is selected during the afternoon, the AQM 151 may exclude the campaign item containing the mature audience commercial from placement within the selected COD content. Similarly, if the commercial is intended for children, the information within the campaign item asset may not be relevant to a more mature audience. Thus, if the COD content is selected during the late evening when children are not present, the AQM 151 may exclude the campaign item from placement within that selected COD content. So, when the campaign item does not meet the valid date/time conditions, the AQM 151 removes the campaign item from potential insertion into the selected COD content, in the process element 360. The AQM 151 then determines whether there are any available campaigns remaining from the loaded list of active campaign items, in the process element 361. If there are no available campaigns, the AQM 151 generates an empty placement, in the process element 363 (E2), as described above, and responds to the COD 103, in the process element 364. For example, once the AQM 151 evaluates all of the campaign items and excludes all of those campaign items in the process element 354, the AQM 151 then determines if there are any campaigns left for potential placement in the selected COD content. If there are none, the AQM 151 may generate an empty response and contact the COD 103 such that the COD 103 may place an asset in the selected COD content as desires or leave it empty. Otherwise, the AQM 151 transfers the information pertaining to the remaining campaigns, items, and assets to the ARM 152 (B1).

In continuing the evaluation of campaign items, in the process element 354, the AQM 151 validates the metadata conditions of a campaign item, in the process element 356. For example, assets generally have metadata associated with them that describe certain features of the asset, such as a particular actor in the asset, the theme of the asset, targeted audience for the asset, maturity level of the asset, etc. In one embodiment, these metadata features are contained in an EIDR identifier as discussed above. If the assets of the campaign item being evaluated do not meet the desired metadata conditions for the selected COD content, that campaign item is removed from consideration, in the process element 360. To illustrate, the actor Alec Baldwin has been seen in several Capital One credit card commercials. A campaign item by the Capital One credit card company may wish to have those commercials inserted into the certain COD content featuring Alec Baldwin as an actor, such as the television show, 30 Rock. Thus, if the selected COD content does not include Alec Baldwin, that campaign item may be excluded from potential insertion into the selected COD content. Alternatively or additionally, if the COD content requires assets of a certain type, the metadata of the assets may be used to exclude the assets from the content. For example, if the content precludes mature content, campaign items having assets with mature themes may be excluded from the selected COD content based on the metadata of the assets relating to maturity level.

The AQM 151 is also operable to validate break/position conditions of the COD content selected by the CPE 107, in the process element 357. For example, if the selected COD content has only 30 second pre roll and post roll timeslots available for asset insertions and the campaign item mandates that the asset be placed at the mid roll timeslot in a COD content, then the campaign item is excluded and removed in the process element 360.

Once the various conditions for the campaign items have been validated, the AQM 151 then evaluates the individual assets in a particular campaign, in the process element 358. An example of such is shown and described in greater detail in FIG. 12. From there, the AQM 151 determines if there are any remaining goals of a particular campaign. If so, the AQM 151 returns to evaluate the remaining campaign items in the campaign (e.g., via process elements 355-358). For example, a campaign may include a campaign item that desires 1000 views of an asset within a certain time period (e.g., a week). Once the asset has been inserted into COD content 1000 times within that time period, the goal has been reached and the campaign item and/or the asset may be excluded from insertion to the presently selected COD content and thus removed from consideration, in the process element 360. In other words, once a goal for a campaign item has been met, it may provide little or no value to the MSO. Accordingly, the AQM 151 may exclude the campaign item from consideration so that other more valuable campaign items may be selected. Examples of campaign goals include campaign duration (e.g., % completion thereof), total number of desired placements, and the like. Otherwise, the AQM 151 adds the campaign item to a list of remaining available campaign items in the process element 362 and continues determining the availability of campaign items, in the process element 353 (B2), to evaluate the campaign items for possible insertion to the selected COD content.

FIG. 12 is an exemplary flowchart illustrating how the AQM 151 evaluates individual assets of a campaign item in the process element 358 (C1). The AQM 151 initiates this process by determining whether there are any remaining assets within a particular campaign item. As mentioned, individual campaign items may include multiple assets. Thus, if one asset of a campaign item being evaluated is excluded from insertion, another asset of that same campaign item still may be used. If no assets remain for insertion, the campaign item is removed from consideration, in the process element 360. To illustrate, a selected COD content may be high-definition (HD) format. Accordingly, the AQM 151 may validate the video definition of the asset, in the process element 381, to determine whether the asset is formatted in HD. If not, the AQM 151 returns to determine whether there are any assets remaining in the campaign item, in the process element 380. If there are no other assets remaining, then the campaign item is removed in the process element 360.

The AQM 151 is also operable to determine whether an asset is available on the ADM, in the process element 382. For example, the assets are stored in the local asset database 105 and the national asset database 106. These assets are periodically updated as advertisers wish to update their various campaigns with newer assets. Older assets may be removed from the databases making them unavailable for insertion. Thus, even if the older asset exists in the campaign item, that asset is not available for insertion because it does not physically exist in the databases 105 and 106. Accordingly, the AQM 151 removes the asset from consideration and returns to evaluating the remaining assets of the campaign item.

The AQM 151 may also be operable to determine whether an asset is available in a target window, in the process element 383. For example, if the asset is only available during a certain time of the day, day of the week, etc., and the COD content is selected by the CPE 107 outside of that time window, then the AQM 151 removes that asset from consideration. The AQM 151 may also be operable to determine whether an asset is available in a license window, in the process element 384. For example, an asset may physically exist on the local asset database 105 or the national asset database 106 and thus be available for insertion into COD content. However, that asset could include certain licensing information that precludes insertion into COD content by the headend 102 for any of a variety of reasons (e.g., contractual obligations between television provider and network provider have ceased). Thus, the asset may be excluded from insertion into selected COD content based on its license window. Once the AQM 151 completes evaluation of the assets within a particular campaign item, the AQM 151 returns to continue evaluating the individual campaign items (C2).

Figure 13:
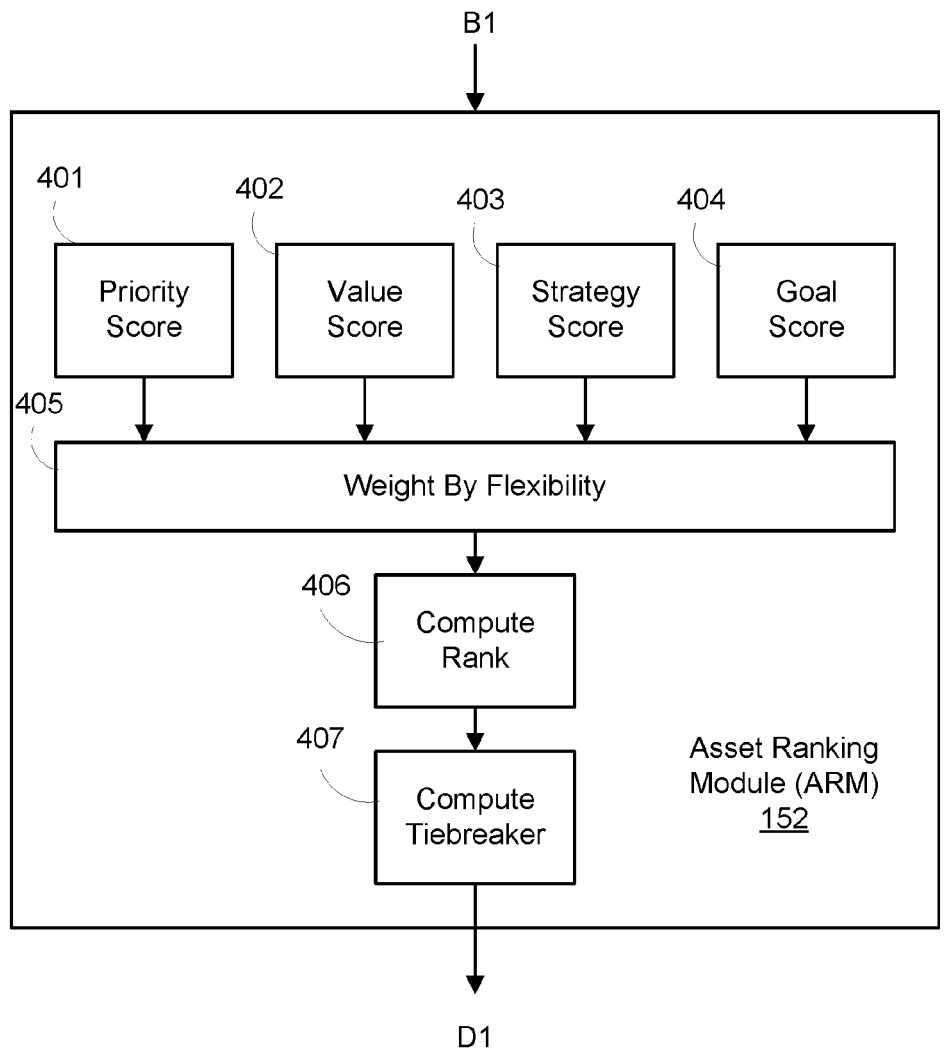
FIG. 13 is a block diagram of an exemplary Asset Ranking Module (ARM) within a COD asset insertion decision system.

FIG. 13 is a block diagram of an exemplary Asset Ranking Module (ARM) 152 within the COD asset insertion decision system 101. The ARM 152 receives information regarding the campaign assets that are available for insertion into the content provided by COD 103. In this embodiment, the ARM 152 includes a priority score module 401, a value score module 402, a strategy score module 403, and a goal score module 404. The ARM 152 also includes a weight by flexibility module 405. Generally, the ARM 152 calculates a total score for each item in a campaign based on a priority score, a value score, a strategy score, a health score, and a flexibility score, etc. For example, the ARM 152 may calculate a total score for each of the campaign items based on the function of: (priority score+value score+strategy score+health score)/flexibility score. The particulars of how each of these scores may be calculated by the ARM 152 are discussed in greater detail below.

The priority score module 401 is any device or system operable to generate priority information for the campaign items provided to the ARM 152 by the AQM 151. A priority score relates to a weighted representation of how important a campaign item is in relation to other items in a campaign. The priority score module 401 may calculate a priority score for each of the campaign items in a campaign based on the function of: (campaign priority value/sum of all priority values for the campaign items)*(parameter weight/100). For the function, the campaign priority value is assigned by the manager that creates the campaign. The parameter weight is a value used to modify how much the priority score figures into the total score.

The value score module 402 is any device or system operable to generate value score information for the campaign items provided to the ARM 152 by the AQM 151. A value score for a campaign item relates to a weighted representation of the income generated by inserting a particular campaign item into content. The value score module 402 may calculate a value score for each of the campaign items in a campaign based on the function of: ((campaign item value)/(the sum of all values for the campaign items in the campaign))*(parameter weight/100). For the function, the campaign item value is the currency value that is assigned for the campaign item. The currency value may be paid upon the campaign item being inserted into the content and/or the campaign item being viewed by a customer (i.e., a user of the CPE 107). The parameter weight is a value used to modify how much the value score figures into the total score.

The strategy score module 403 is any device or system operable to generate strategy scoring information for the campaign items provided to the ARM 152 by the AQM 151. A strategy score for a campaign item relates to a weighted representation of how the campaign item is distributed during an active campaign. Some examples of how the campaign item may be distributed include an even distribution, an "as soon as possible (ASAP)" distribution, etc. The strategy score module 403 may calculate a strategy score for each of the campaign items in a campaign based on the function of: ((campaign item strategy value)/(the sum of all campaign items strategy values for the campaign items in the campaign))*(parameter weight/100). For the function, the campaign item strategy value may be "0" for an even distribution and "1" for an ASAP distribution. Other strategies may exist as any values in between. The parameter weight is a value used to modify how much the strategy score figures into the total score.

The goal score module 404 is any device or system operable to generate goal information for the campaign items provided to the ARM 152 by the AQM 151. A goal score for a campaign item relates to a weighted representation of whether the campaign item is behind schedule, on schedule, or ahead of schedule to meet its goal. The goal score module 404 may calculate a goal score for each of the campaign items based on the function of: ((campaign item health score)/(the sum of all of the campaign item goal values for each of the campaign items in the campaign))* (parameter weight/100). The parameter weight is a value used to modify how much the goal score figures into the total score. The campaign item health score may be determined by the function of: ((% of goal remaining)/(% of time remaining in the campaign)). The "% of goal remaining" may be determined by the function of: ((the campaign item goal−current count))/(campaign item goal). The current count is based on the insertions or views of the campaign item. The "% of time remaining" may be determined by the function of: (hours remaining for the campaign item/total hours for the campaign item), where the hours remaining is a time from the current time through the end of the flight window for the campaign item (e.g., a period of time when the asset is to air). The total hours in the function is the number of hours for the duration of the flight window of the campaign item from beginning to end. Some examples of a goal score are >1 when the campaign is running behind schedule and <1 when the campaign is running ahead of schedule.

The scoring information calculated by modules 401-404 is provided to the weight by flexibility module 405. The weight by the flexibility module 405 is any device or system that is operable to generate flexibility information for the campaign items. The flexibility for a campaign item relates to a representation of how much flexibility exists for a campaign item for placement into the content. For example, a highly flexible campaign item may have little or no restrictions as to what times and/or where the campaign item is placed within the content. In contrast, a campaign item with little or no flexibility may be restricted to a few hours per day or to a few days per week. The weight by the flexibility module 405 may calculate a flexibility score for each of the campaign items based on the function of: (number of days/7)*(average hours/24)*(average number of breaks/program break default)*(average number of positions/program position default). In this function, the number of days is the count of unique days of the week the campaign item is eligible for. For example, if a campaign item is eligible to run Monday, Wednesday, and Friday, then the number of unique days is 3. The average hours may be based on the function of: (the sum of the durations of the campaign item/the count item time instances). The "program break default" in the function is a value assigned by a campaign manager that indicates the standard count of breaks in a session. The average number of breaks may be calculated based on the function of: (the sum of eligible breaks for all positions)/(a count of break positions). The eligible breaks are determined for each position as follows. When the break position is pre-roll or post-roll, the break count is 1. When the break position for the campaign item is "any", then the break count is "program break default". When the break position is mid-roll and the mid-roll by number is "null", then the break count is the ("program break default"−2). When the break position is mid-roll and the number is not null, then the break count is 1. The "program position default" in the function is a value assigned by the campaign programmer that indicates the typical or standard count of positions in a break. The average number of positions may be calculated based on the function of: (the sum of eligible positions for all breaks)/(the count of breaks), where the eligible breaks are determined for each break criteria as follows. When the position is first or last, then the break count is 1 for the break criteria. When the position is "any", then the break count is "program position default" for the break criteria.

After weight by the flexibility module 405 calculates a flexibility score for each of the campaign items, then the priority score, the value score, the strategy score, the goal score, and the flexibility score are provided to a compute rank module 406. The compute rank module 406 is any device or system operable to generate ranking information for the campaign items. The compute ranking module 406 generates a ranking for each of the campaign items based on the function of: ((priority score+value score+strategy score+ goal score)/flexibility score). In some cases, one or more campaign items may have a tie ranking. A compute tiebreaker module 407 may utilize a number of other criteria for determining ranking in cases where campaign items are tied. Some examples of the criteria used by the compute tiebreaker module 407 include random assignment (e.g., "coin toss" algorithm), policies regarding preferred campaigns, etc. The ARM 152 then provides the list of campaign items along with their corresponding rankings to the process element 451 of FIG. 13 (D1) to begin conflict resolution between assets.

It should be noted, that the various scores and flexibility may be reconfigured as a matter of preference and that the above equations are merely used as exemplary embodiments. For example, an operator of the headend 102 may intrinsically value certain asset campaigns over others for any number of reasons. Accordingly, the operator of the headend 102 may direct the COD asset insertion decision system 101 to "hard wire" the campaign priority value to a particular value. If the preference of the headend 102 operator were to change, then the operator may direct the COD asset insertion decision system 101 to change the campaign priority value accordingly. This dynamic change capability allows the ARM 152 to provide more flexibility to headends 102 on an as needed basis.

Figure 14:
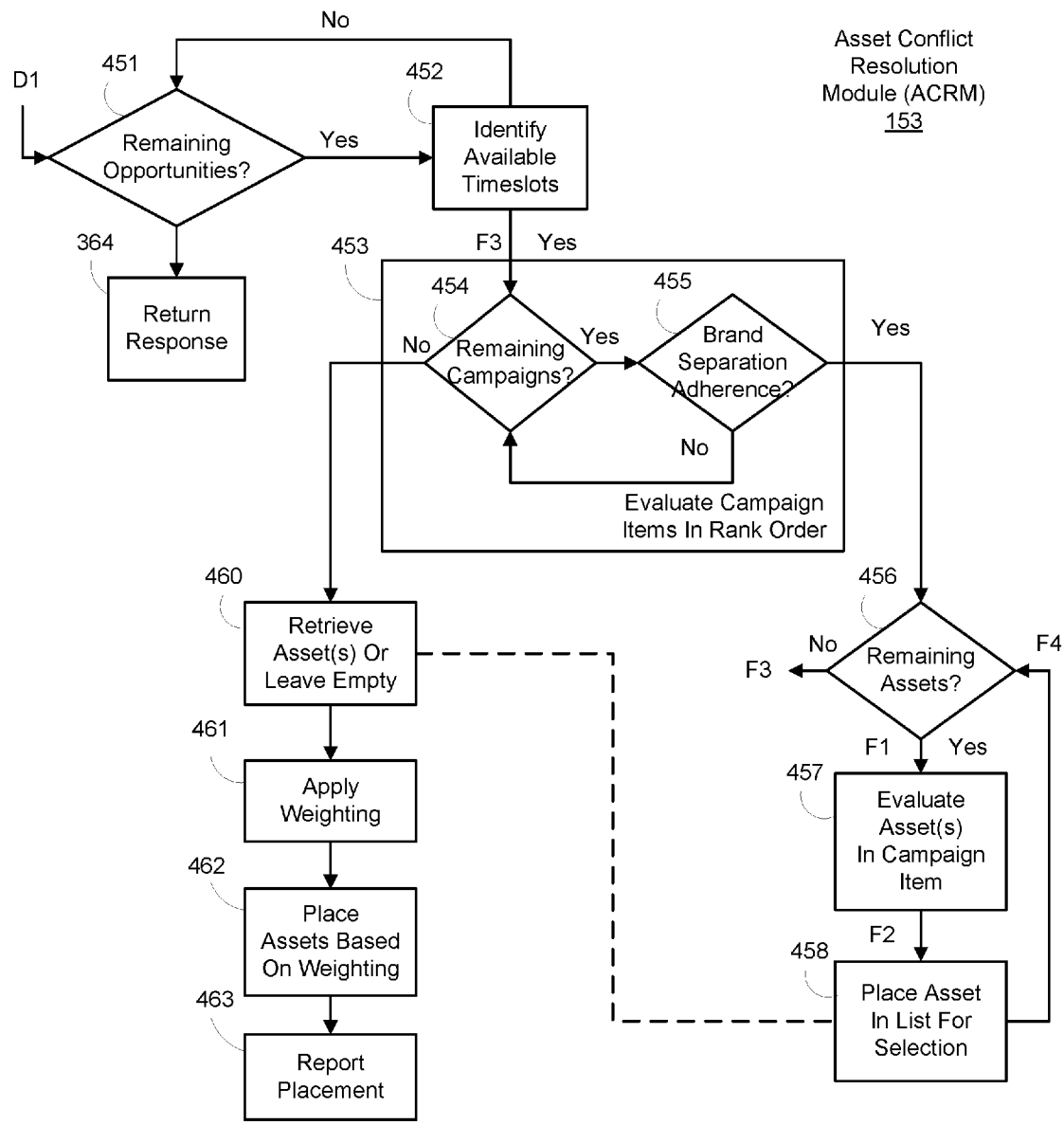
FIGS. 14 and 15 are exemplary flowcharts of an Asset Conflict Resolution Module (ACRM) within a COD asset insertion decision system.
Figure 15:
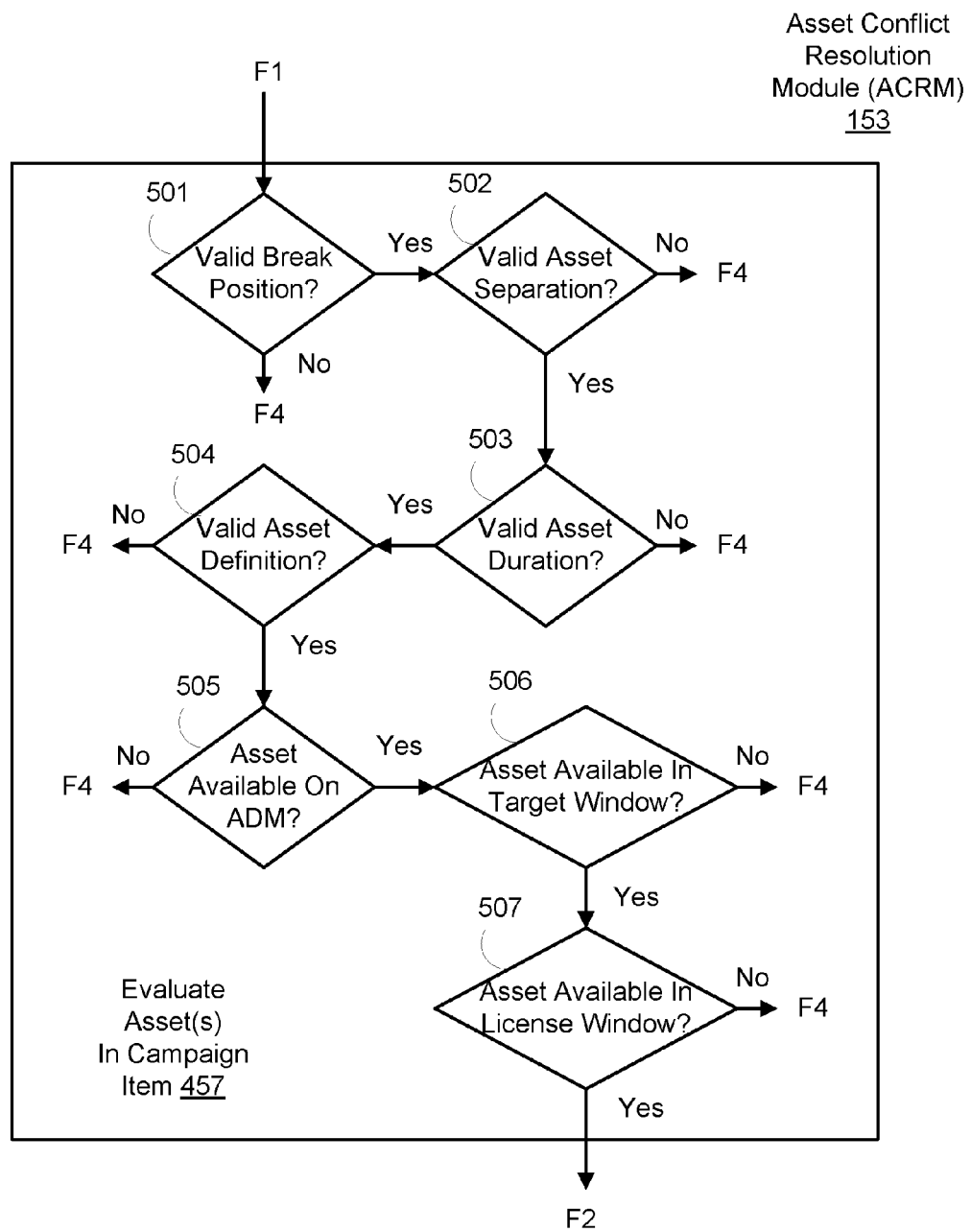

FIGS. 14 and 15 are exemplary flowcharts of the ACRM 153 within the COD asset insertion decision system 101. These flowcharts illustrate the process of excluding assets based on conflicts with other assets and campaigns after the campaign items have been ranked by the ARM 152 (i.e., via D1). The ACRM 153 initially determines whether any opportunities remain for placement within the COD content selected by the CPE 107. In other words, the ACRM 153 determines whether the timeslots of the selected COD content have been filled with assets. If some timeslots remain open, or unfilled, the ACRM 153 proceeds to identify which timeslot positions remain open and available for asset placement (e.g., pre-roll, mid-roll, post-roll, etc.), in the process element 452. If, however, no opportunities for asset placement remain in the selected COD content, the ACRM 153 may generate and return a response to the COD 103, in the process element 364, indicating that no assets will be placed in the selected COD content.

When the time slots for asset placement have been identified in the COD content selected by the CPE 107, the ACRM 153 evaluates the campaign items in rank order (i.e., as ranked by the ARM 152), in the process element 453. The ACRM 153, as an initial part of a loop process through each of the ranked campaign items, determines whether any campaigns remain in the list of ranked campaign items from the ARM 152, in the process element 454. The ACRM 153 then determines whether a particular campaign being evaluated is adhering to brand separation, in the process element 455. For example, some companies prefer that their assets not be placed near assets of a competitor within the same content, COD content or otherwise. To illustrate, the Coca-Cola Company may desire that an asset relating to a Coca-Cola beverage not be placed next to a Pepsi-Cola asset from the Pepsi-Cola Company so as to show individuality of its particular brand. In other words, the brand of the Coca-Cola asset may become diluted when placed next to a Pepsi-Cola asset because the audience may simply equate the two brands as interchangeable cola products. Thus, if a campaign item being evaluated does not adhere to a certain level of brand separation, the ACRM 153 excludes the assets of the campaign item from insertion and searches for another campaign among the ranked list, in the process element 454. If the campaign item does adhere to brand separation, the ACRM 153 starts a loop to evaluate the individual assets in the campaign item, in the process element 457 (F1), by first determining whether any assets remain in the campaign item, in the process element 456. In other words, the ACRM 153 loops through the assets in each campaign item to determine their potential for insertion into the selected COD content. An example of the evaluation of individual assets is illustrated in FIG. 15, shown and described below. Once the asset(s) of the campaign item being evaluated has also been evaluated, the asset(s) is placed in a list that directs the selection of the asset(s) for insertion to the selected COD content. Afterwards, the ACRM 153 returns to the process element 456 to loop through the remaining assets of the campaign item. If no assets remain in the campaign item, the ACRM 153 loops through the evaluation of the individual campaign items in rank order, in the process element 453.

Once all of the campaign items at each campaign have been evaluated and no campaigns remain (i.e., process element 454) or once all of the placement opportunities have been filled, the ACRM 153 directs the COD 103 to retrieve the assets based on the list generated in the process element 458. For example, the list may be included in a report message that is transferred to the COD 103 to direct the COD 103 to insert the assets into the content selected by the CPE 107. It is possible that all of the assets have been excluded during the processes described herein. Thus, the ACRM 153 may then direct the COD 103 to not place any assets in the content selected by the CPE 107. Alternatively, the ACRM 153 may direct the COD 103 to place assets from the local database 105 and/or the national database 106 into the selected COD content as desired. The ACRM 153 may also direct the COD 103 to place assets relating to content, programming, or even services provided by the television provider. For example, if no assets remain, standard programming information, such as time and date, pertaining to the selected COD content may be configured as an asset and placed in the selected COD content. To further illustrate, when an episode of "Modern Family" is selected by a CPE 107 and no assets remain for insertion into the available time slots of that episode, the ACRM 153 may direct the COD 103 to present the user of the CPE 107 with the date and time when the next episode of Modern Family can be seen. However, the invention is not intended to be limited to any particular type of noncommercial asset.

Since is also possible that not all of the assets in the list may be placed as there may be more assets than available opportunities, the ACRM 153 may weight the assets prior to placement in the selected COD content, in the process element 461. For example, certain assets may provide greater value to the MSO or content provider (e.g., the television network). In this regard, the ACRM 153 may rank the remaining assets in a manner that provides the most monetary compensation to the headend 102/content provider. Thus, the ACRM 153 may reduce the list of available assets for insertion to the amount of opportunities, or timeslots, in the selected COD content to provide this value to the MSO/content provider. In any case, the ACRM 153 directs the COD 103 to place the assets in the selected COD content based on the ranked list, in the process element 462. Once placement has been directed, the ACRM 153 generates a placement report and transfers that report to the headend 102 so that the headend 102 can track marketing views (e.g., for later negotiations between television providers and marketers). For example, when a marketer can know how many views of a particular asset there were in a selected COD content, the marketer can assign a value to that asset that may be used in negotiating price for additional views of the asset in future selected COD content.

In FIG. 15, the ACRM 153 loops through the assets in each campaign item to determine their potential for insertion into the selected COD content (F1). During the evaluation of a particular asset, if the asset fails to qualify for insertion into the selected COD content, the ACRM 153 may return to the process element 456 to determine whether there are any other assets remaining for evaluation (F4). Otherwise, the ACRM 153 continues through a variety of evaluation steps. In this embodiment, the ACRM 153 initiates by determining valid break positions within the selected COD content, in the process element 501. For example, an asset may require insertion into a certain timeslot within the COD content. If that timeslot is not available for the asset, the asset may be excluded from consideration. The ACRM 153 may also determine whether there is a valid asset separation of a particular asset, in the process element 502. For example, while the brand separation adherence is determined in the process element 455, certain other assets may require separation within COD content. To provide another real-world example, the Coca-Cola Company may wish to not place an asset pertaining to Coca-Cola products immediately next to one another so as to not bombard the user of the CPE 107 with multiple advertisements at roughly the same time. Accordingly, the ACRM 153 may ensure that the assets of a particular company, product, etc. are separated within the selected COD content.

The ACRM 153 may also determine whether a particular asset is of the proper duration, in the process element 503. For example, some timeslots within COD content are only available in 30 second "chunks". Thus, if the asset under evaluation is only 15 seconds, there would be a period of 15 seconds of unoccupied airtime in the COD content. The ACRM 153, in this regard, may then exclude that asset from insertion into the selected COD content. Alternatively, the ACRM 153 may search for another 15 second asset within the potential assets for insertion alongside the 15 second asset to fully occupy the placement opportunity and prevent missing a placement opportunity in the COD content. The ACRM 153 may also determine whether the asset is the correct video definition for insertion into the COD content, in the process element 504. For example, COD content may vary in terms of definition from selection to selection. Some COD content selections may be of a SD format whereas the assets may be in an HD format. To ensure that the assets can be placed in the selected COD content and played at the same format of the SD COD content selection, the ACRM 153 may exclude those HD formatted assets (and vice versa).

As part of an extension to the exclusion process by the AQM 151, the ACRM 153 may also be configured to communicate with the ADM to determine whether the asset is available at the ADM (process element 505), whether the assets is available in the target window (process element 506), and whether the asset is available in the license window (process element 507). The process element 457 ends (F2) with the placement of the asset in the list for selection in the process element 458 of FIG. 14.

Figure 16:
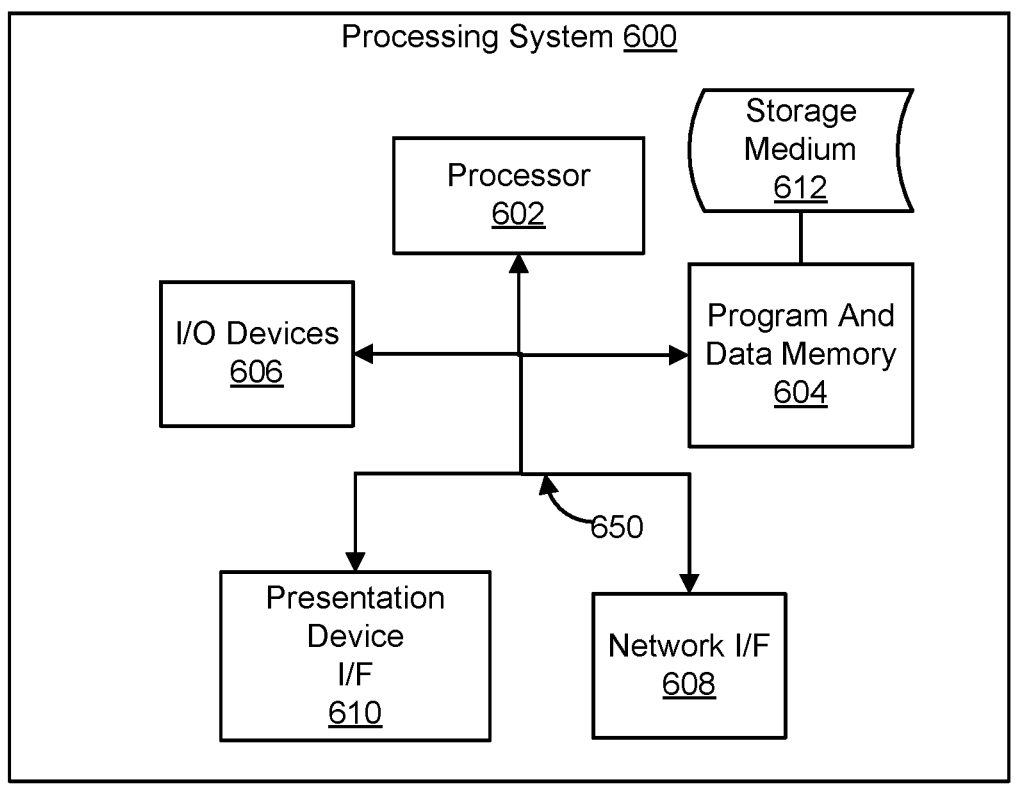
FIG. 16 is a block diagram of an exemplary processing system operable to implement a COD asset insertion decision system.

FIG. 16 is a block diagram depicting a processing system 600 also operable to provide the above features by executing programmed instructions and accessing data stored on a computer readable storage medium 612. In this regard, embodiments of the invention can take the form of a computer program accessible via the computer-readable medium 612 providing program code for use by a computer or any other instruction execution system. For the purposes of this description, computer readable storage medium 612 can be anything that can contain, store, communicate, or transport the program for use by a computer.

The computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 600, being suitable for storing and/or executing the program code, includes at least one processor 602 coupled to memory elements 604 through a system bus 650. Memory elements 604 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 606 (including but not limited to keyboards, displays, pointing devices, etc) can be coupled to the processing system 600 either directly or through intervening I/O controllers. Network adapter interfaces 608 may also be coupled to the system to enable the processing system 600 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by the processor 602.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. An Asset-insertion Decisioning System (ADS) that directs asset insertion into Content On Demand (COD), the ADS comprising:
    a processor that implements an asset ranking module that identifies one or more of a plurality of assets that are available for insertion to a COD selection by a Customer Premises Equipment (CPE), calculates a flexibility score for each of the available assets that represents a likelihood of future availability of an asset, and ranks the available assets based on the flexibility score for each of the available assets, wherein the flexibility score is based on an instruction received for the asset; and
    the processor further implementing an asset conflict resolution module that processes campaigns of asset providers, the campaigns each having one or more of the available assets, to qualify the campaigns for the COD selection, identifies asset timeslots within the COD selection, evaluates the campaigns in the order of the rank of the available assets, and excludes available assets of a campaign from insertion when the campaign violates a brand separation rule of recently inserted assets,
    wherein, for remaining assets adhering to the brand separation rule, the asset ranking module further ranks the remaining assets, and directs insertion of at least a portion of the remaining assets in the COD selection based on the rank of remaining assets.

2. The ADS of claim 1, further comprising:
an interface that receives instructions from the asset providers regarding insertion goals,
wherein the asset ranking module further calculates a scheduling score for each of the available assets based on completed progress toward an insertion goal received for each of the available assets, and ranks the available assets based on a combination of the scheduling score and the flexibility score.

3. The ADS of claim 2, wherein:
the interface further receives an update to a received instruction; and
wherein the asset ranking module further determines assets associated with the update, recalculates the flexibility score for the determined assets, recalculates the scheduling score for the determined assets, and ranks the available assets based on the recalculations.

4. The ADS of claim 1, further comprising:
an interface that receives instructions from the asset providers regarding asset priorities,
wherein the asset ranking module further calculates a priority score for each of the available assets based on a received asset priority for an asset, and ranks the available assets based on a combination of the flexibility score and the priority score.

5. The ADS of claim 1, further comprising:
an interface that receives instructions from the asset providers regarding asset strategy,
wherein the asset ranking module further calculates a strategy score for each of the available assets based on a received asset strategy for an asset, the strategy score indicative of a desired distribution of an asset over time, and ranks the available assets based on a combination of the flexibility score and the priority score.

6. The ADS of claim 1, wherein:
a provider of the COD selection is a streaming video provider; and
the ADS is configured within a server of the streaming video provider.

7. The ADS of claim 1, wherein:
a provider of the COD selection is a cable television provider or a satellite television provider; and
the ADS is communicatively coupled to a headend of the cable television provider or a headend of satellite television provider.

8. A method operable with an Asset-insertion Decisioning System (ADS) that directs asset insertion into Content On Demand (COD), the method comprising:
identifying one or more of a plurality of assets that are available for insertion to a COD selection by a Customer Premises Equipment (CPE);
calculating a flexibility score for each of the available assets that represents a likelihood of future availability of an asset;
ranking the available assets based on the flexibility score for each of the available assets, wherein the flexibility score is based on an instruction received for the asset
processing campaigns of asset providers, the campaigns each having one or more of the available assets;
qualifying the campaigns for the COD selection;
identifying asset timeslots within the COD selection;
evaluating the campaigns in the order of the rank of the available assets;
excluding available assets of a campaign from insertion when the campaign violates a brand separation rule of recently inserted assets; and
for remaining assets adhering to the brand separation rule, ranking the remaining assets; and
directing insertion of at least a portion of the remaining assets in the COD selection based on the rank of remaining assets.

9. The method of claim 8, further comprising:
receiving instructions from the asset providers regarding insertion goals;
calculating a scheduling score for each of the available assets based on completed progress toward an insertion goal received for each of the available assets; and
ranking the available assets based on a combination of the scheduling score and the flexibility score.

10. The method of claim 9, further comprising:
receiving an update to a received instruction;
determining assets associated with the update;
recalculating the flexibility score for the determined assets;
recalculating the scheduling score for the determined assets; and
ranking the available assets based on the recalculations.

11. The method of claim 8, further comprising:
receiving instructions from the asset providers regarding asset priorities;
calculating a priority score for each of the available assets based on a received asset priority for an asset;
ranking the available assets based on a combination of the flexibility score and the priority score.

12. The method of claim 8, further comprising:
receiving instructions from the asset providers regarding asset strategy;
calculating a strategy score for each of the available assets based on a received asset strategy for an asset, the strategy score indicative of a desired distribution of an asset over time; and
ranking the available assets based on a combination of the flexibility score and the priority score.

13. The method of claim 8, wherein:
a provider of the COD selection is a streaming video provider; and
the ADS is configured within a server of the streaming video provider.

14. The method of claim 8, wherein:
a provider of the COD selection is a cable television provider or a satellite television provider; and
the ADS is communicatively coupled to a headend of the cable television provider or a headend of satellite television provider.

15. A non-transitory computer readable medium comprising instructions that, when executed by a processor of an Asset-insertion Decisioning System (ADS), causes the processor to asset insertion into Content On Demand (COD), the instructions further directing the processor to:
identify one or more of a plurality of assets that are available for insertion to a COD selection by a Customer Premises Equipment (CPE);
calculate a flexibility score for each of the available assets that represents a likelihood of future availability of an asset;
rank the available assets based on the flexibility score for each of the available assets, wherein the flexibility score is based on an instruction received for the asset
process campaigns of asset providers, the campaigns each having one or more of the available assets;
qualify the campaigns for the COD selection;
identify asset timeslots within the COD selection;

evaluate the campaigns in the order of the rank of the available assets;
exclude available assets of a campaign from insertion when the campaign violates a brand separation rule of recently inserted assets; and
for remaining assets adhering to the brand separation rule, rank the remaining assets; and
direct insertion of at least a portion of the remaining assets in the COD selection based on the rank of remaining assets.

16. The computer readable medium of claim 15, further comprising instructions that direct the processor to:
receive instructions from the asset providers regarding insertion goals;
calculate a scheduling score for each of the available assets based on completed progress toward an insertion goal received for each of the available assets; and
rank the available assets based on a combination of the scheduling score and the flexibility score.

17. The computer readable medium of claim 16, further comprising instructions that direct the processor to:
receive an update to a received instruction;
determine assets associated with the update;
recalculate the flexibility score for the determined assets;
recalculate the scheduling score for the determined assets; and
ranking the available assets based on the recalculations.

18. The computer readable medium of claim 15, further comprising instructions that direct the processor to:
receive instructions from the asset providers regarding asset priorities;
calculate a priority score for each of the available assets based on a received asset priority for an asset; and
rank the available assets based on a combination of the flexibility score and the priority score.

19. The computer readable medium of claim 15, further comprising instructions that direct the processor to:
receive instructions from the asset providers regarding asset strategy;
calculate a strategy score for each of the available assets based on a received asset strategy for an asset, the strategy score indicative of a desired distribution of an asset over time;
rank the available assets based on a combination of the flexibility score and the priority score.

20. The computer readable medium of claim 15, wherein:
a provider of the COD selection is a streaming video provider; and
the ADS is configured within a server of the streaming video provider.

21. The computer readable medium of claim 15, wherein:
a provider of the COD selection is a cable television provider or a satellite television provider; and
the ADS is communicatively coupled to a headend of the cable television provider or a headend of satellite television provider.

* * * * *